United States Patent
Nagae et al.

[19]

[11] Patent Number: 6,078,379
[45] Date of Patent: Jun. 20, 2000

[54] LIQUID CRYSTAL DISPLAY DEVICE PROVIDED WITH SEAL MATERIAL AND SPACER MADE OF RESIST

[75] Inventors: Nobukazu Nagae, Tenri; Yoshihiro Izumi, Kashihara, both of Japan

[73] Assignee: Sharp Kabushiki Kaisha, Osaka, Japan

[21] Appl. No.: 09/094,966

[22] Filed: Jun. 12, 1998

[30] Foreign Application Priority Data

Jun. 13, 1997 [JP] Japan ................................ 9-157148
Aug. 26, 1997 [JP] Japan ................................ 9-229621

[51] Int. Cl.[7] ........................ G02F 1/1339; G02F 1/1347
[52] U.S. Cl. ........................... 349/155; 349/153; 349/74
[58] Field of Search ............................ 349/155, 74, 153

[56] References Cited

U.S. PATENT DOCUMENTS

| | | | |
|---|---|---|---|
| 4,362,771 | 12/1982 | Umeda et al. | 428/1 |
| 5,379,139 | 1/1995 | Sato et al. | 359/81 |
| 5,808,719 | 9/1998 | Fujiwara et al. | 349/157 |
| 5,812,226 | 9/1998 | Izumi et al. | 349/73 |
| 5,835,181 | 11/1998 | Nakamura et al. | 349/189 |
| 5,838,405 | 11/1998 | Izumi et al. | 349/73 |
| 5,847,785 | 12/1998 | Izumi | 349/73 |

OTHER PUBLICATIONS

Japanese Kokai (Published unexamined patent application) No. 184849/1996 (Tokukaihei 8–184849, published date: Jul. 16, 1996).

Japanese Kokoku (Published examined utility model application) No. 28086/1992 (Jitsukohei 4–28086, published date: Jul. 7, 1992).

*Primary Examiner*—William L. Sikes
*Assistant Examiner*—Tarifur R. Chowdhury
*Attorney, Agent, or Firm*—David G. Conlin; Christine C. O'Day

[57] ABSTRACT

With respect to a single large substrate, a seal material and a spacer made of the same resist having pressure tightness are formed in one step using a photomask, and a plurality of small substrates are combined independently with the large substrate, the spacer being formed within a region of non-transmissive pattern on the large substrate. This prevents the seal material and the spacer from spreading from a predetermined pattern width, and maintains a constant value for a cell gap with respect to the entire liquid crystal layer. Alternatively, instead of the spacer, a fine first seal material may be formed by photolithography within a display region using a photoresist having adhesion, and a second seal material may be formed outside the display region using a heat curable adhesive. With this arrangement, the strength of the combined substrates is increased, and a highly reliable and high quality display screen is realized.

10 Claims, 20 Drawing Sheets

FIG. 6(a)
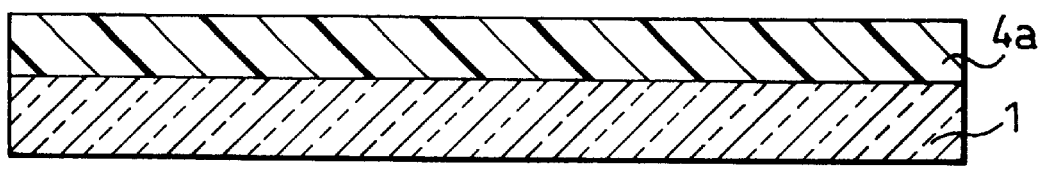
FIG. 6(b)
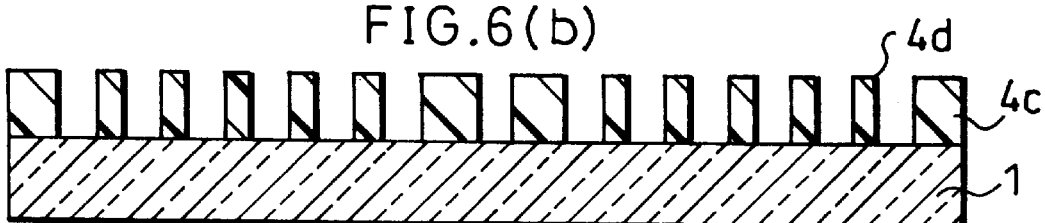
FIG. 6(c)
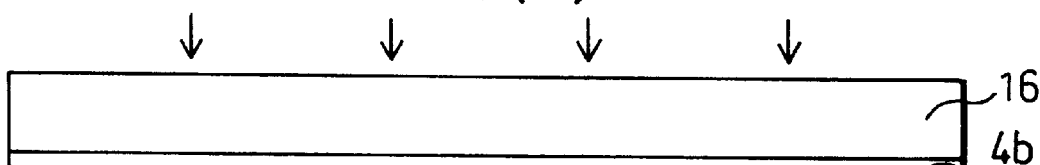
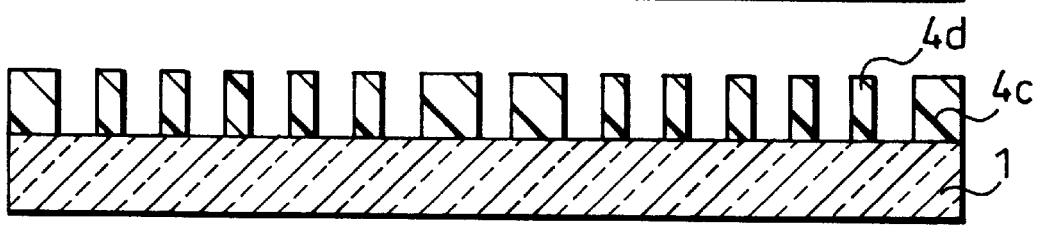
FIG. 6(d)
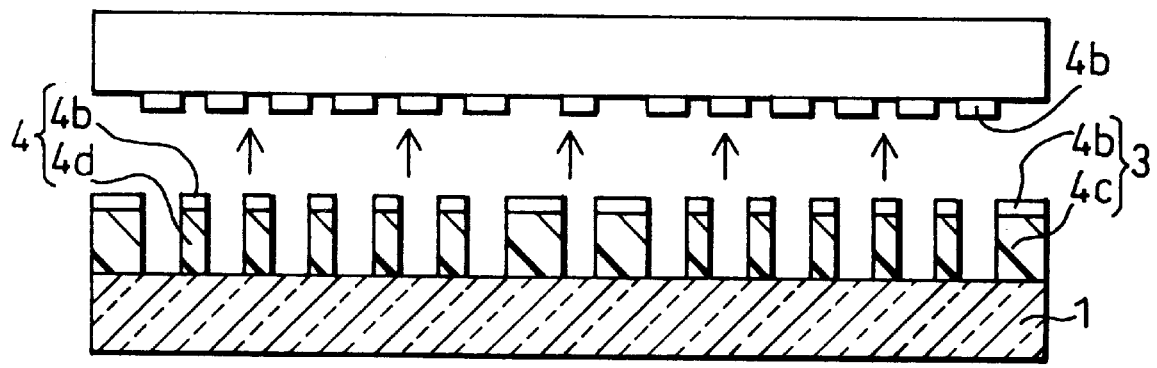

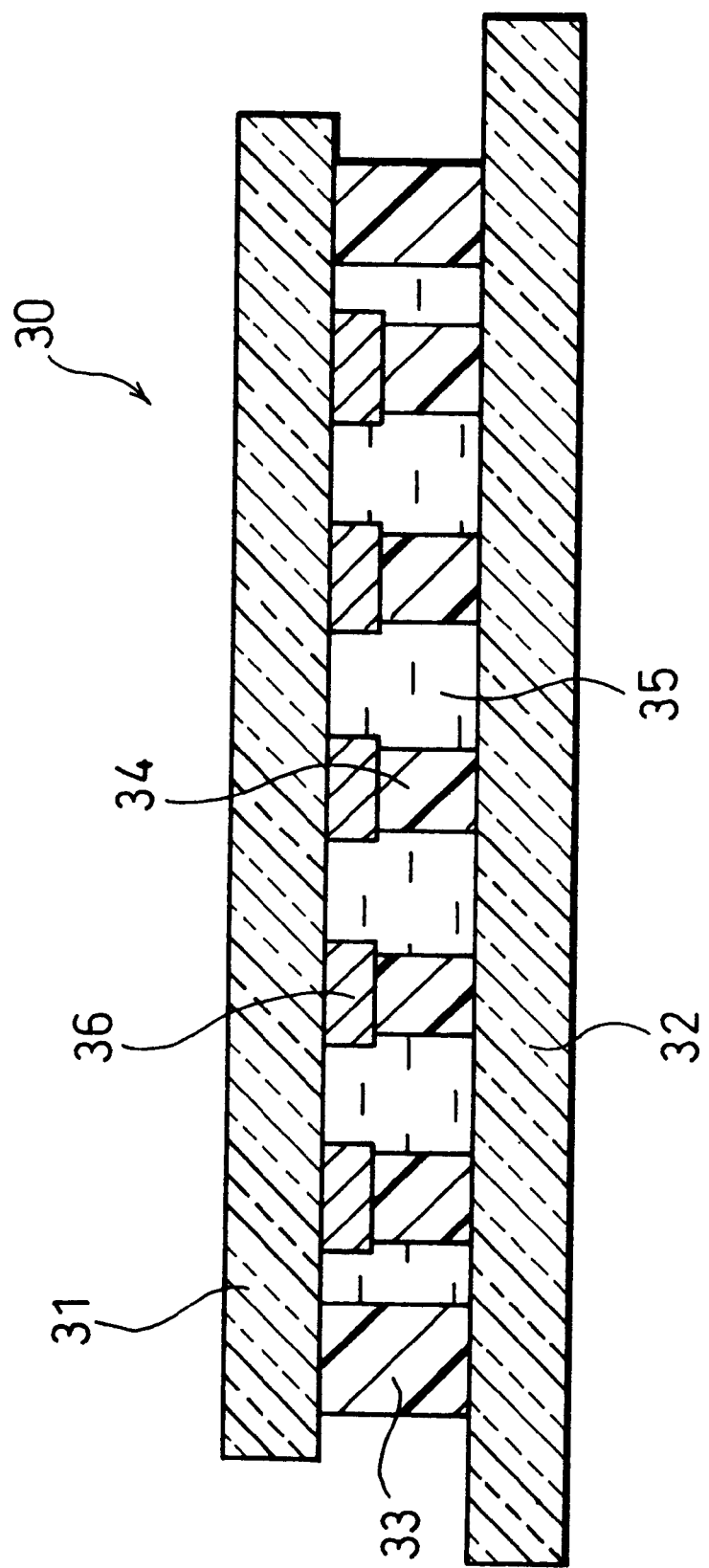

LIQUID CRYSTAL DISPLAY DEVICE PROVIDED WITH SEAL MATERIAL AND SPACER MADE OF RESIST

FIELD OF THE INVENTION

The present invention relates to a liquid crystal display device of direct-viewing type having a large display screen for use in, for example, AV (Audio-Visual) devices and OA (Office Automation) devices, and particularly to a liquid crystal display device having a high displaying quality adopting combined active matrix substrates, and a manufacturing method the same.

BACKGROUND OF THE INVENTION

In recent years, there has been a demand for finer display devices for use in AV devices and OA devices, and making the screen of these devices larger. As such display devices, a variety of display devices such as a display device adopting the Cathode Ray Tube (CRT) system, a liquid crystal display device (LCD), a plasma display device (PDP), an electroluminescense (EL) display device, and a light-emitting diode (LED) display device are available. In these display devices, in response to making the screen larger, an increase in weight, dimensions, and power consumption are expected, and so there has been a demand for, in addition to enlarging the screen, making the display devices lighter, thinner, and less power consuming.

Of these display devices, the liquid crystal display device (referred to as LCD hereinafter) has such advantages in that, compared with other display devices, the thickness (depth) is far thinner, the power consumption is low, and a full color can be realized with ease. For this reason, the LCD is suitable for display devices having a larger screen such as a large monitor and a wall display device, and is considered to be the best candidate for realizing a larger screen.

However, in the LCD, when the screen is made larger, the fraction defective is abruptly increased due to breakage of a signal wire and a pixel failure in the manufacturing process. Also, the manufacturing process is complicated as a result of screen enlargement. This presents a problem that the price of the LCD is increased.

In order to solve this problem, an LCD in which a larger screen is realized by connecting a plurality of small sub-strates with each other has been suggested. The LCD in which a larger screen is realized in this manner has an arrangement wherein at least one of a pair of substrates having electrodes constituting the LCD is a large connected substrate which is prepared by connecting a plurality of small substrates on the sides.

Particularly, in the LCD of active-matrix type, it is extremely difficult to manufacture an active-matrix substrate, which is a substrate provided with fine active elements per pixel, having a large area with a good yield. In order to overcome this difficulty, the active-matrix substrate is manufactured by connecting a plurality of small substrates with each other on the sides so as to realize a single connected substrate (large active-matrix substrate). In this manner, by providing the active-matrix substrate, which is difficult to manufacture in a large size, in the form of a connected substrate, it is possible to improve the efficiency in productivity of the LCD having a large screen.

As such LCD adopting the connected substrate, a liquid crystal panel disclosed in Japanese Examined Utility Model No. 28086/1992 (Jitsukouhei 4-28086), and an LCD and manufacturing method thereof disclosed in Japanese Unexamined Patent publication No. 184849/1996 (Tokukaihei 8-184849) are available.

For example, the LCD disclosed in Japanese Unexamined Patent publication No. 184849/1996 (Tokukaihei 8-184849) has an arrangement wherein, as shown in FIG. 19(a) and FIG. 19(b), a single large substrate 61, composed of four small substrates 61a connected to each other in a "tile" manner, is combined with a counter substrate 62 via a liquid crystal layer 64 which is sealed by a seal material 63. In this LCD, a supporting member 66 is provided between a connected portion of the small substrates 61a and a non-transmissive pattern 65 formed on the counter substrate 62.

To explain more specifically, as shown in FIG. 19(b), a plurality of small substrates 61a (four in FIG. 19(a) and FIG. 19(b)) brought into close proximity with each other on a single plane are positioned so as to face the single counter substrate 62. On the counter substrate 62, there is provided the non-transmissive pattern 65 in the form of a grid corresponding to a region surrounding each pixel. The facing side edges of the plurality of small substrates 61a are bonded with one another by a fixing adhesive 67. Also, the seal material 63 is provided on the periphery on the surface of the counter substrate 62 facing the small substrates 61a, and the liquid crystal layer 64 is sealed by the seal material 63 in a spacing between the counter substrate 62 and the small substrates 61a bonded with each other. On respective outer surfaces of the small substrates 61a bonded with each other and the counter substrate 62, a polarizing plate 68 is provided. Also, the supporting member 66 is provided between the connected portion (seam) by the adhesive 67 and the non-transmissive pattern 65 facing the connected portion.

Note that, as the supporting member 66 provided on the sides of the small substrates 61a connected to each other, a material in which a space keeper (spacer) (not shown) is added to the same resin as that of the seal material 63 is adopted. Also, as the resin of the seal material 63 and the supporting member 66, UV curable resin or heat curable resin is adopted. The seal material 63 and the supporting member 66 are generally formed in a predetermined pattern using a screen printing method or dispense profiling method.

The following describes manufacturing steps of the LCD. First, the seal material 63 and the non-transmissive pattern 65 are formed on the counter substrate 62. Thereafter, the small substrates 61a are connected to each other by the adhesive 67. Then, on the non-transmissive pattern 65 formed on a position corresponding to the connected portion of the small substrates 61a, the supporting member 66 made of the same material as that of the seal material 63 is formed.

Therefore, the supporting member 66 is provided between (a) the connected portion of the small substrates 61a connected to each other by the adhesive 67 and (b) the non-transmissive pattern 65 facing the connected portion. By the supporting member 66, it is possible to prevent the display screen from being adversely affected by a step-difference between the small substrates 61a, and the fraction nondefective from being lowered, thus improving productivity.

However, in the LCD and the manufacturing method thereof as disclosed in Japanese Unexamined Patent publication No. 184849/1996 (Tokukaihei 8-184849) and other publications, due to the LCD structure and the manufacturing process, the following problems (1) and (2) are presented.

(1) The manufacturing process of the described LCD is required to include a step of facing and combining the connected substrate and the large substrate with each other, and the following step of setting the cell gap of the liquid crystal layer which is a spacing between the substrates. Of the two steps, in the step of facing and combining the two substrates with each other, resin to be the seal material and the supporting member (seal material 63 and supporting member 66 in FIG. 19(b)) is formed on a portion of the large substrate corresponding to the outer frame region of the small substrates to be the connected substrate. The main functions of the seal material and the supporting member are (a) to combine the connected substrate and the large substrate with each other and (b) to seal the liquid crystal layer.

Then, the connected substrate is combined with the large substrate in accordance with the pattern of resin. Thereafter, using a pressing device, etc., the substrates are pressed against each other so as to set the cell gap. After setting the cell gap, the resin to be the seal material, which has not been cured yet, is cured so as to form the seal material.

Here, in pressing for setting the cell gap, the resin has not been cured yet. For this reason, the pattern width of the resin is slightly spread by pressing. When the resin is spread in this manner, there is a case that the resin thus spread protrudes into the display screen region of the liquid crystal layer.

In particular, at the connected portion of the small substrates, it is required to narrow the connected portion as much as possible. This is because when the connected portion is wide, the connected portion becomes noticeable on the display screen as the pixel pitch is disturbed at the connected portion, and this makes the display screen to look unnatural as a whole.

The resin protruded into the display screen region in the described manner is shielded by a non-transmissive pattern such as a black matrix (BM). Since the non-transmissive pattern is a non-display region on the display screen, the display screen is prevented from being adversely affected by the protruded resin. However, in order to shield the protruded resin, it is required to widen the region of the non-transmissive pattern.

However, when the non-transmissive pattern is widened only at the connected portion, as described, the connected portion becomes noticeable as the pixel pitch is disturbed only at the connected portion; thus, it is required to widen the non-transmissive pattern with respect to the entire display screen. However, when the region of the non-transmissive pattern is widened, another problem is presented in that the aperture ratio of the pixels is lowered.

The lowering of the aperture ratio of the pixels darkens the entire display screen and the contrast is lowered. As means for preventing lowering of contrast, the backlight may be illuminated with higher illuminance. However, this is not preferable since the power consumption by the backlight is increased, and as a consequence the power consumption of the entire LCD is also increased.

Further, the resolution of the display screen of the LCD whose aperture ratio of pixels has lowered is lower than the resolution of an ordinary LCD having the same display screen size.

Generally, the width of a non-display region between pixels is set in such a manner that the pattern of two rows of the seal material and the connection margin are within the set width. For this reason, a pixel is required to include a non-display region having a certain area. However, in order to improve the resolution, it is required to reduce the area of each pixel in spite of the fact that the area of non-display region remains constant regardless of the pixel area. Thus, in the LCD having the described arrangement, when the resolution is to be improved by reducing the pixel area, the proportion of the non-display region is relatively increased with respect to the pixel area. As a result, the aperture ratio of pixels is further lowered.

Therefore, in the LCD in which a larger screen is realized by connecting a plurality of small substrates to one another, as described, unless the lowering of aperture ratio is prevented, it is difficult to improve the display quality of the LCD. In order to solve this problem, at the connected portion of the small substrates in particular, it is required to prevent resin to be a supporting member from spreading from a predetermined pattern width.

(2) In response to making the screen of LCD larger, the area of the liquid crystal layer sandwitched between the connected substrate and the large substrate is increased accordingly. As a result, it becomes difficult to sufficiently maintain a constant value for the cell gap of the liquid crystal layer, which is the thickness of the liquid crystal layer whose area has been increased, with respect to the entire liquid crystal layer.

When the cell gap is insufficiently maintained, in the liquid crystal layer, there is a case that the liquid crystal is unevenly distributed on the bottom of the display screen by the dead weight. This generates display nonuniformity on the display screen.

The following describes the problem of (1) more specifically. First, as shown in FIG. 20(a), the resin of the seal material 63 or the supporting member 66 on the surface of the counter substrate 62 immediately after screen printing or dispense profiling has a semi-cylindrical shape having a height H1. When the counter substrate 62 is faced and pressed against the plurality of small substrates 61a, as shown in FIG. 29(b), the resin having a semi-circular cross section before pressing process is spread flat by the pressing process.

Note that, in the pressing process, the cell gap is set (also known as "gapping") so that a spacing H2 between the small substrates 61a and the counter substrate 62 constituting the LCD takes a desired value (generally, several $\mu$m).

Here, the accuracy of the height H1 of the seal material before pressing process depends on the mechanical accuracy of the screen printing or the dispense profiling, and generally has an error of substantially ±10 percent. Accordingly, the width W2 of the seal material after pressing process also has an error of substantially ±10 percent. The positioning accuracy of the seal pattern also depends on the mechanical accuracy of the screen printing or the dispense profiling, and therefore an error of several ten $\mu$m is generated.

As described, in the seal material as formed by the screen printing or the dispense profiling, the dimension accuracy and the positioning accuracy are both poor. Thus, as described, in the conventional LCD, the problem of (1) is presented, and the problem of (2) is also presented when the screen is made larger. As a result, in the conventional LCD, it has not been possible to realize a large screen LCD while maintaining a high display quality.

SUMMARY OF THE INVENTION

The present invention offers a solution to the above-mentioned problems, and accordingly it is an object of the present invention, in a liquid crystal display device in which a large screen is realized by combining (i) a connected substrate composed of a plurality of small substrates and (ii) a large substrate facing each other by a seal material, to provide a liquid crystal display device having a high displaying quality with an improved production efficiency in which resin to be the seal material is prevented from protruding from a predetermined pattern width and a cell gap of a liquid crystal layer having a large area is uniformly maintained at a constant value, and a manufacturing method the same.

It is another object of the present invention to provide a liquid crystal display device in which a displaying quality and the strength are improved by appropriately changing the material and the way in which the seal material is patterned, depending on positions of the seal material.

In order to achieve the above-mentioned objects, the liquid crystal display device in accordance with the present invention includes a large substrate having a non-transmissive pattern formed in matrix, a connected substrate, facing the large substrate, composed of a plurality of small substrates connected to one another on side surfaces, a liquid crystal layer sandwiched between the large substrate and the connected substrate, a seal material for combining the large substrate and the connected substrate with each other, and a spacer for maintaining a predetermined value for a thickness of the liquid crystal layer sandwiched between the large substrate and the connected substrate, wherein the seal material and the spacer are made of resist having pressure tightness.

With this arrangement, since the seal material and the spacer are made of resist, when setting the cell gap by pressing against each other the large substrate and the connected substrate, the resist can be provided in a cured state. Thus, in the pressing process, the resist does not spread from the pattern width by pressing and does not protrude into the display screen region.

Further, since not only the seal material but the spacer is made of resist, it is possible to finely form the seal material and the spacer using a photomask in one step. Thus, at the connected portion of the small substrates, the seal material can be provided in a vicinity of the display screen region, and it is possible to form the spacer within a region of non-transmissive pattern so as to be shielded by the non-transmissive pattern on a display screen.

As a result, at the connected portion, it is not required to widen the region of the non-transmissive pattern in order to shield the seal material, and it is possible to provide the spacer in the number capable of maintaining a sufficient cell gap without adversely affecting the display screen. Thus, in the liquid crystal display device in accordance with the present invention, the aperture ratio of the pixels is prevented from being lowered, and displaying nonuniformity due to nonuniform cell gap is not generated, thus realizing a high quality liquid crystal display device with improved contrast and resolution of the display screen.

The seal material and the spacer are made of resist having pressure tightness. This arrangement is applicable not only to the arrangement wherein the small substrates are connected to one another but also to a common liquid crystal display device and a liquid crystal display device in which a large screen is realized by connecting a plurality of liquid crystal panels.

Also, in order to achieve the above-mentioned objects, the manufacturing method of the liquid crystal display device in accordance with the present invention includes the steps of:

forming a resist to be a seal material and a spacer in a predetermined pattern in a cured state on a large substrate having a non-transmissive pattern formed in matrix;

combining a plurality of small substrates with the large substrate provided with the resist in such a manner that the plurality of small substrates constitute a single connected substrate by being adjacent to one another side by side; and setting a thickness of a spacing between the large substrate and the connected substrate to a predetermined value by pressing against each other the large substrate and the connected substrate facing each other.

With this manufacturing method, when pressing against each other the substrates for setting the cell gap, the seal material and the spacer are formed as a cured resist. Since the shape of the resist is stabilized by being cured, when the substrates are pressed against each other, the resist to be the seal material is prevented from spreading from a predetermined pattern width and protruding into the display screen region. As a result, it is not required to take into account protrusion of the seal material and the spacer by widening the region of the non-transmissive pattern for shielding of the seal material and the spacer, thus improving the aperture ratio of pixels on the display screen.

Further, since the seal material and the spacer are formed as a development pattern using a photomask in one step, the manufacturing process is simplified. Also, the plurality of small substrates are combined with the large substrate before being connected to each other to constitute the connected substrate. Thus, it is possible to prevent complication in the manufacturing process in that the connected substrate is required to be handled with care due to the fact that the structure of the connected substrate is instable since the area connecting the small substrates is small.

In order to achieve the above-mentioned objects, another liquid crystal display device in accordance with the present invention includes a plurality of small substrates having pixel electrodes, and at least one counter substrate having common electrodes, the plurality of small electrodes being connected to one another side by side on a single plane so as to face the counter substrate, the plurality of small substrates and the counter substrate being combined with each other by a seal material provided along a periphery on a surface of each of the plurality of small substrates facing the counter substrate, the seal material being composed of a first seal material and a second seal material made of a material different from that of the first seal material, the first seal material being provided within a display region, the second seal material being provided outside the display region, wherein the display region including a plurality of pixels is formed by a liquid crystal layer held in a spacing surrounded by the plurality of small substrates, the counter substrate, and the seal material.

With this arrangement, the material of the seal material is changed in accordance with the positions of the seal material. Thus, within the display region in which the seal material is required to be completely shielded by the non-transmissive pattern, as the first seal material, a material having superior dimension accuracy and positioning accuracy is adopted. On the other hand, outside the display region in which the substrates are bonded with each other and the liquid crystal layer is sealed with certainty, as the second seal material, a material having superior bonding strength and high reliability for sealing of the liquid crystal layer is adopted. As a result, the aperture ratio of pixels can be made as large as possible, and the adhesion, reliability, and durability of the substrates are ensured.

In order to achieve the above-mentioned objects, another manufacturing method of the liquid crystal display device in accordance with the present invention includes the step of forming a display region including a plurality of pixels by combining with each other (a) a plurality of small substrates having pixel electrodes, connected to each other side by side on a single plane and (b) at least one counter substrate having common electrodes, facing the plurality of small substrates, the plurality of small substrates and the counter substrate being combined with each other by a seal material provided on a periphery on a surface of each of the plurality of small substrates facing the counter substrate, the display region being formed by a liquid crystal layer held in a spacing surrounded by the plurality of small substrates, the counter substrate, and the seal material, wherein a portion of the seal material, positioned within the display region is patterned by photolithography.

With this manufacturing method, since the width and the position of the seal material provided within the display region are controlled in an order of micro meters, it is possible to adjust the dimension of the width and the position of the first seal material with high accuracy. This allows the seal pattern to be formed in such a manner that the aperture ratio of pixels can be made as large as possible. As a result, it is possible to manufacture a liquid crystal display device capable of displaying a high quality image without lowering the aperture ratio of pixels and without discontinuity of display screen.

For a fuller understanding of the nature and advantages of the invention, reference should be made to the ensuing detailed description taken in conjunction with the accompanying drawings.

BRIEF DESCRIPTION OF THE DRAWINGS

FIG. 6(a) through FIG. 6(d) are drawings illustrating the manufacturing steps in the manufacturing method of liquid crystal display device of FIG. 1.

FIG. 9 is a cross sectional drawing showing an arrangement of a liquid crystal display device in accordance with Second Embodiment of the present invention.

DESCRIPTION OF THE EMBODIMENTS

First Embodiment

The following will describe one embodiment of the present invention referring to attached drawings. Note that, the following descriptions do not limit the present invention.

Figure 1:
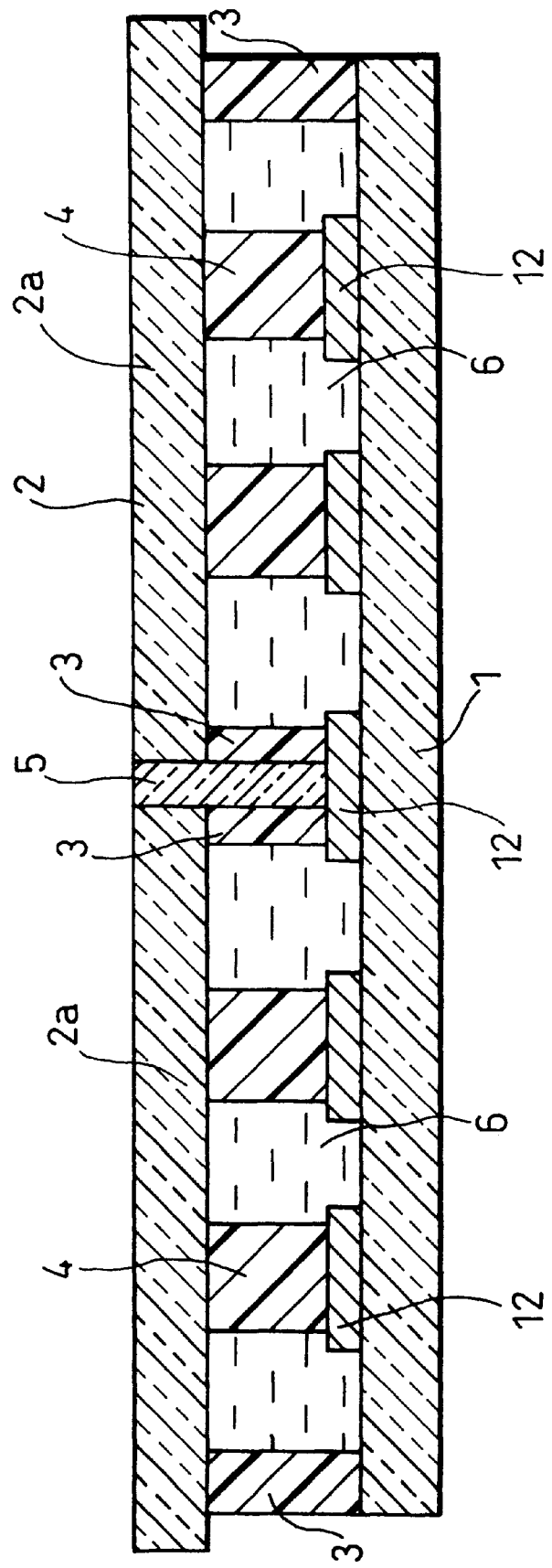
FIG. 1 is a cross sectional drawing showing an arrangement of a liquid crystal display device in accordance with First Embodiment of the present invention.

As shown in FIG. 1, a liquid crystal display device (referred to as LCD hereinafter) 10 of the present embodiment has an arrangement wherein a single large substrate (counter substrate or common substrate, referred to as CF substrate hereinafter) 1 is combined with a single connected substrate 2 which has been prepared by connecting two active matrix substrates (referred to as TFT substrates hereinafter) 2a on the sides, the active matrix substrates 2a being provided as small substrates adopting TFT as an active element. The CF substrate 1 and the connected substrate 2 are combined with each other by seal materials 3, spacers 4, and an adhesive 5 at the connected portion of the TFT substrates 2a.

The CF substrate 1 is combined with each of the TFT substrates 2a by a seal material 3 along peripheries of the each TFT substrate 2a. Thus, the TFT substrates 2a are independently combined with the CF substrate 1 by the seal materials 3. Consequently, a liquid crystal layer 6 is individually sandwiched between each of the TFT substrates 2a and the CF substrate 1.

The seal materials 3 and the spacers 4 are provided on the CF substrate 1. The spacers 4 and the seal materials 3 at the connected portion are provided within a region of a black matrix (referred to as BM hereinafter) 12 which is a non-transmissive pattern formed on the CF substrate 1. On the pattern of the seal materials 3, as shown in FIG. 2, there are provided openings 15 for injecting liquid crystal.

Figure 2:
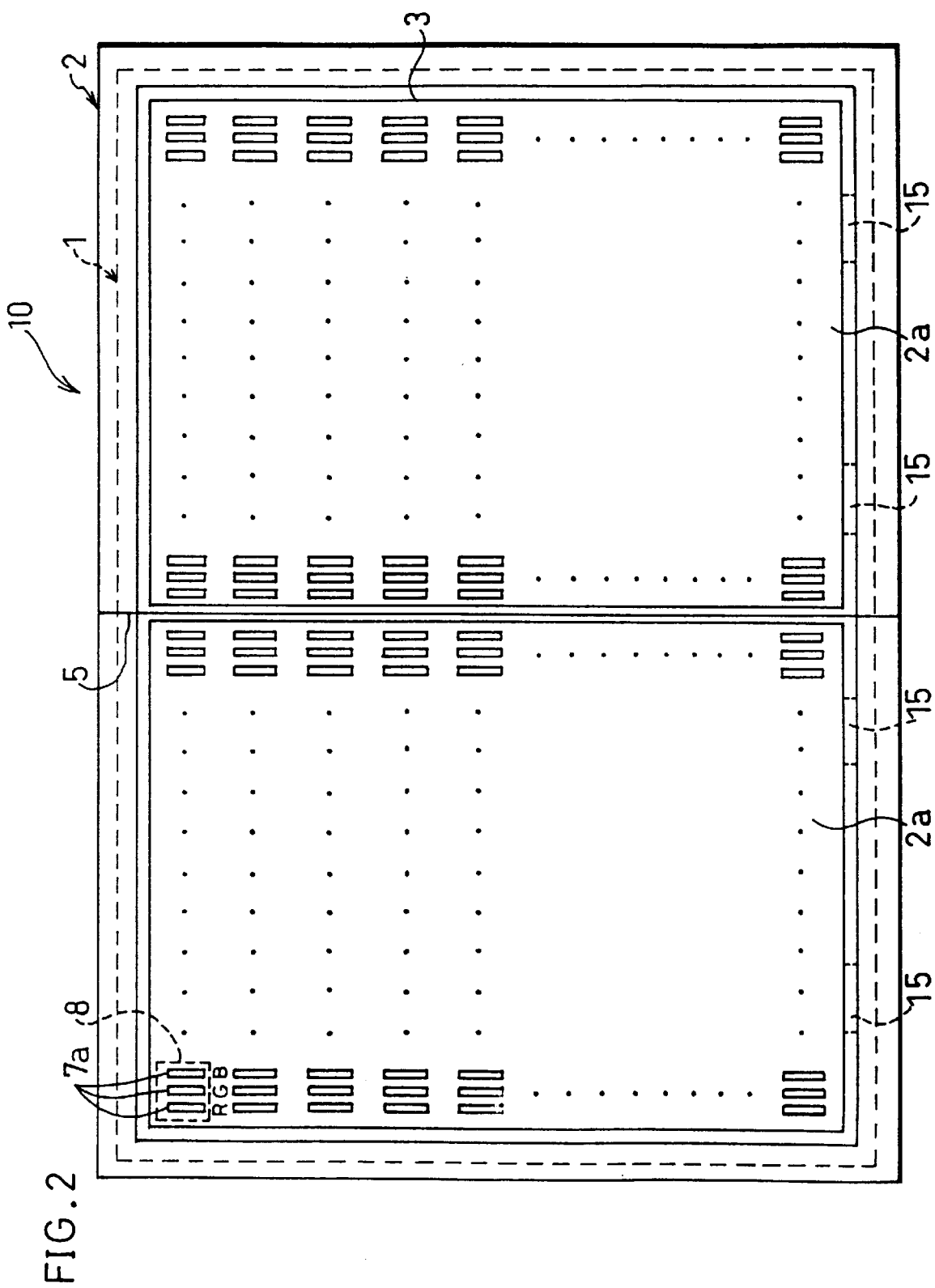
FIG. 2 is a plan view showing the liquid crystal display device of FIG. 1.

On the TFT substrates 2a, as shown in FIG. 2, pixels 8 are provided in matrix, and each pixel 8 is provided with three pixel electrodes 7a corresponding to color filters of red (R), green (G), and blue(B), respectively.

Figure 3:
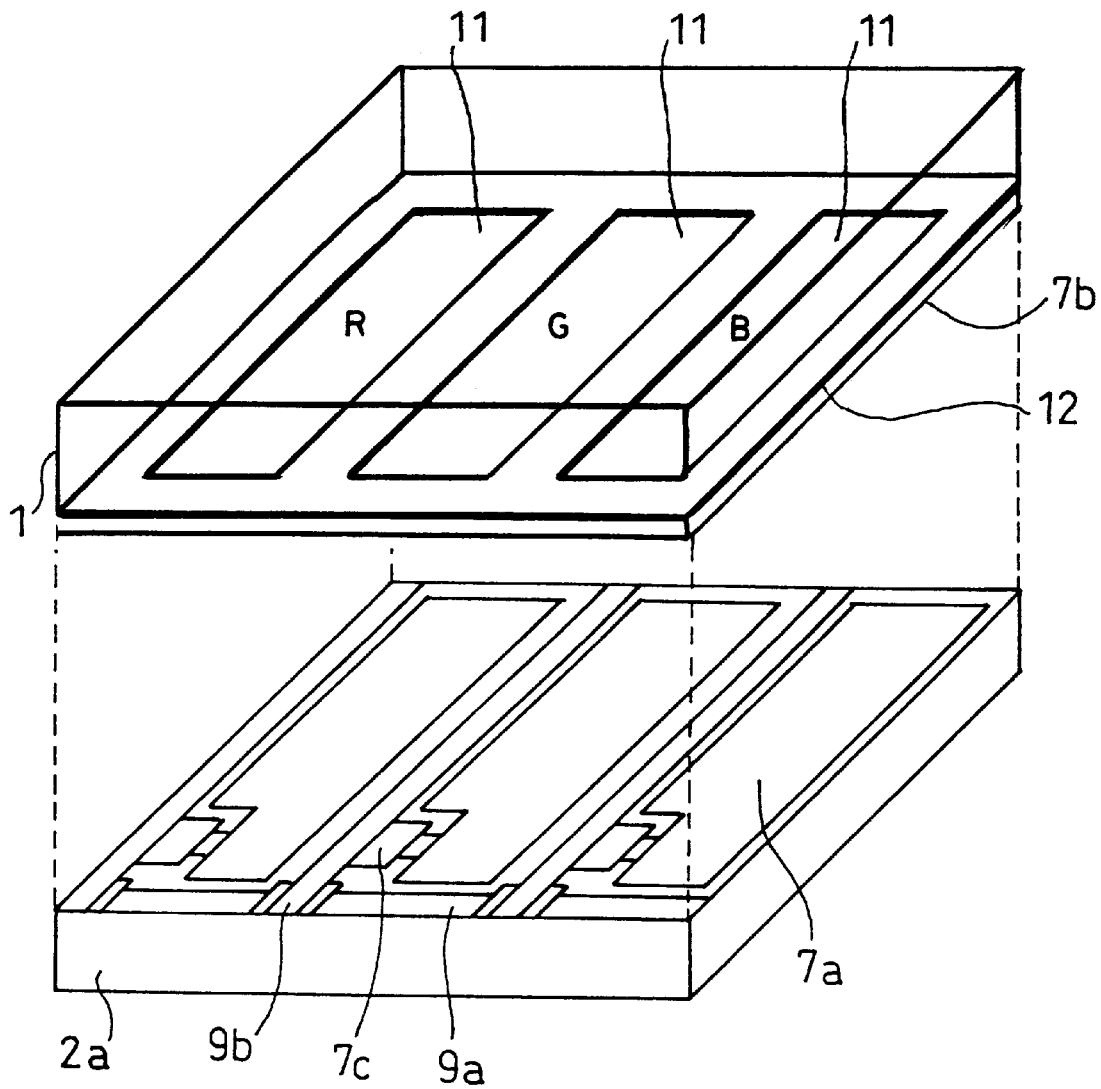
FIG. 3 is a perspective view showing an arrangement of main components of a pixel in the liquid crystal display device of FIG. 1.

To explain the TFT substrates 2a of FIG. 1 and FIG. 2 in more detail, as shown in FIG. 3, each of the pixel electrodes 7a is provided with a TFT 7c as an active element, and a scanning line 9a and a signal line 9b, orthogonal to each other, for driving the pixel electrode 7a. The CF substrate 1 is provided with the color filters (referred to as CF hereinafter) 11, BM 12, and common electrodes 7b.

As shown in FIG. 1, the connected portion of the TFT substrates 2a is filled with the adhesive 5 which is resin having a refractive index substantially the same as the refractive index of the material constituting the TFT substrates 2a, and layers of the seal materials 3 are provided so as to contact the both sides of a layer of the adhesive 5. The adhesive 5 is connected to the TFT substrates 2a on the sides, and contacts with the CF substrate 1.

Namely, the two TFT substrates 2a are combined with the CF substrate 1 not only by the seal materials 3 and the spacers 4 but also by the adhesive 5 at the connected portion. The layer of the adhesive 5 and the layers of the seal materials 3 are provided within the region of the BM 12 on the CF substrate 1, facing the connected portion.

Figure 4:
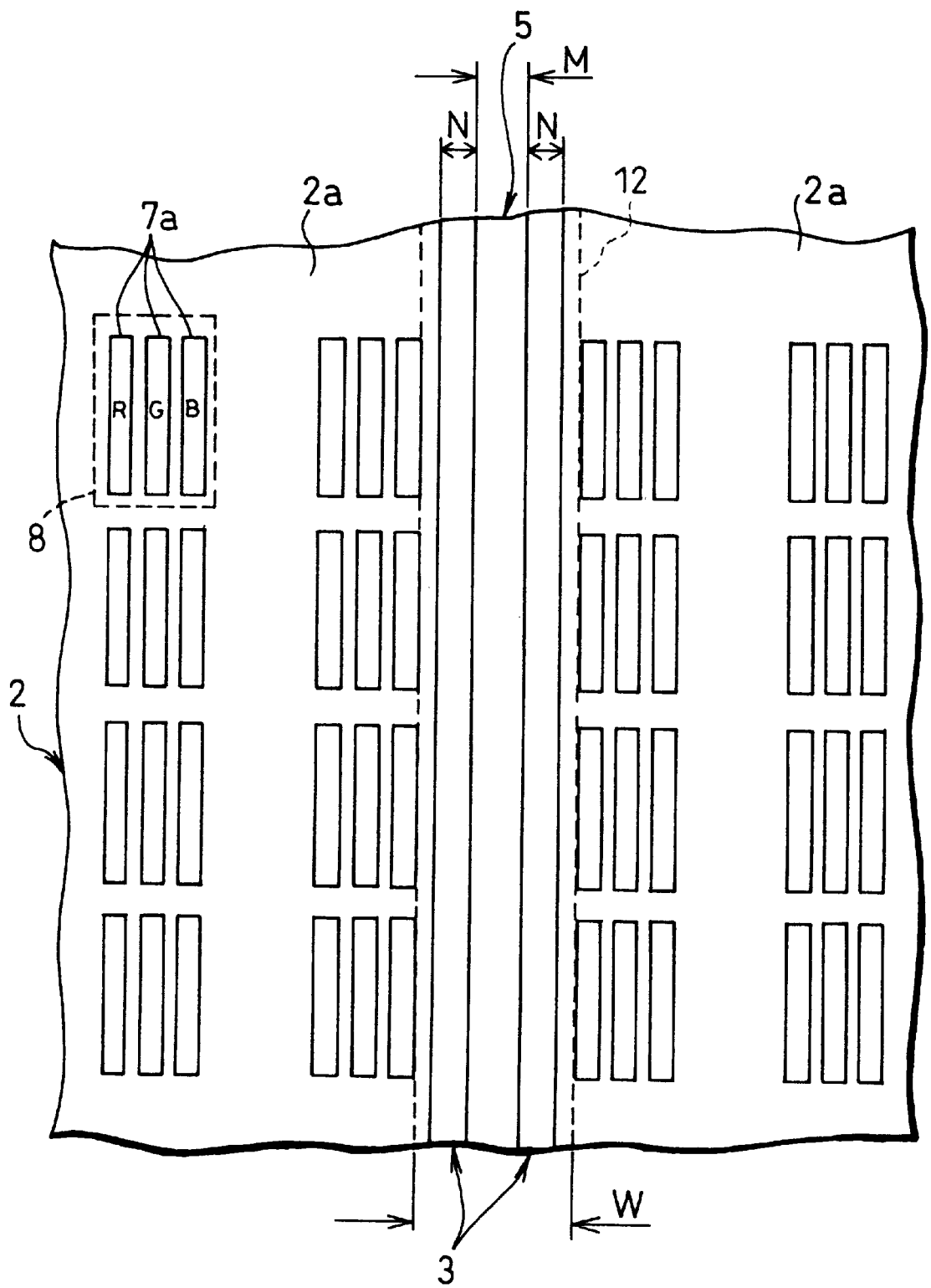
FIG. 4 is a plan view showing an arrangement of pixels and non-display region in the liquid crystal display device of FIG. 1.

Specifically, as shown in FIG. 4, at the connected portion, the layer composed of the seal materials 3 and the adhesive 5 at the connected portion is provided so as not to overlap the three pixel electrodes 7a constituting the pixel 8. Namely, the BM 12 formed on the CF substrate 1 is a non-displaying region which does not overlap with the pixel electrodes 7a. Thus, when the layer composed of the seal materials 3 and the adhesive 5 is provided within the region of the BM 12, the display screen of the LCD 10 is not adversely affected by the layer composed of the seal materials 3 and the adhesive 5.

For example, at the connected portion, when the width of a region of the BM 12 (referred to as width of BM 12 hereinafter) is W, the width of the layer of the adhesive 5 is M, and the width of each layer of the seal materials 3 is N, then the sum M+2N of the layer of the adhesive 5 and the layers of the seal materials 3 satisfies the relation of M+2N<W with respect to the width W of the BM 12.

As a material of the TFT substrates 2a, it is possible to adopt a glass substrate made of, for example, non-alkaline glass ("7059" provided by Corning Inc., etc.). In the present embodiment, two TFT substrates 2a are adopted; however, provided that the TFT substrates 2a are connected to each other by a layer, such as above, composed of the seal materials 3 and the adhesive 5 at the connected portion, three or more TFT substrates may be used. For example, a single connected substrate 2 can be made by connecting four TFT substrates 2a in a "tile" manner.

As the adhesive 5, it is preferable to adopt a transparent material having a refractive index substantially the same as that of the glass substrate from which the TFT substrates 2a are made. Specifically, a UV light curable adhesive is commonly used. Such a UV light curable adhesive having a refractive index substantially the same as the refractive index (1.53 in the case of "7059" provided by Corning Inc.) of the glass substrate constituting the TFT substrates 2a is widely available.

With the described arrangement, it is possible to prevent refraction and scattering of light between the two TFT substrates 2a, and the adverse effect on the display screen caused by coloring of light transmitting through the connected portion is prevented. Further, since no heat is required in curing, the TFT substrates 2a and the CF substrate 1 are not adversely affected by heat.

Incidentally, the resin which has conventionally been used as the seal materials 3 has a drawback in that the resin spreads from a predetermined pattern width when combining the connected substrate 2 composed of the TFT substrates 2a with the CF substrate 1 by pressing. When the resin spreads from the predetermined pattern width in this manner, the resin protrudes into the display screen region, and adversely affects the display screen. As a countermeasure, in order to seal the protruded resin by the BM 12, the width of the BM 12 is made wider at the connected portion considering the protrusion of resin.

However, when the width of the BM 12 is made wider at the connected portion, the aperture ratio of the pixel 8 is reduced. This is due to the fact that since the BM 12 is a non-displaying region on the display screen, when the width of the BM 12 is made wider at the connected portion, the entire region of the BM 12 constituting a single pattern on the display screen is also made wider. Even when the width of the BM 12 is made wider only at the connected portion, the connected portion becomes noticeable on the display screen, and the entire display screen becomes unnatural. The lowering of aperture ratio induces lowering of display quality as the entire display screen is darkened and the contrast and the resolution of the display screen are reduced.

In order to overcome this problem, in the LCD 10 in accordance with the present invention, a resist having pressure tightness is adopted as the resin constituting the seal materials 3. The resist, as will be described later, is made of the same material as that of the spacers 4, and allows the connected substrate 2 and the CF substrate 1 to be combined with each other by the adhesion of the resist or by a layer of an adhesive formed on the resist.

Further, in pressing of the CF substrate 1 and the connected substrate 2 for setting a cell gap after combining thereof, the resist constituting the seal materials 3 can be set to the cured state. Since the cured resist can be stably provided, the resist does not spread from the pattern width during pressing, and the protrusion into the display screen region is prevented.

With this arrangement, at the connected portion of the TFT substrates 2a as shown in FIG. 4, the width N of the seal materials 3 can be positioned in a vicinity of the display screen region, within the region of the width W of the BM 12. Thus, it is not required to take into consideration the protrusion of resin constituting the seal materials 3 and widen the width W of the BM 12 which is a non-display region.

Therefore, in the LCD 10 of the present embodiment, even in the case where the TFT substrates 2a are connected to each other so as to realize a larger screen, unlike the conventional arrangement, it is possible to adopt a pattern substantially the same as the pattern of BM which is commonly adopted as the BM 12. Thus, lowering of aperture ratio of the pixel 8 is not induced.

As described, since the aperture ratio of the pixel 8 is not lowered, it is possible to improve the resolution of the display screen and prevent lowering of contrast. Therefore, it is not required to increase the illuminance of the backlight, thus preventing the power consumption of the LCD 10 from being increased.

Also, when a resist which can be patterned by photolithography is adopted as the seal materials 3, a predetermined pattern of the seal materials 3 can be made finer. This allows the width N of the seal materials 3 to be positioned on the uppermost limit in a vicinity of the display screen region at the connected portion, within the region of the width W of the BM 12. As a result, compared with the conventional arrangement, it is easier to set the pixel pitch at the connected portion the same as the pixel pitch of the other region, thus preventing the adverse effect of the connected portion of the TFT substrates 2a on the display screen, realizing a large display screen natural to the observer.

Further, since the connected portion is provided within the width W of the BM 12, and is filled with the adhesive 5 having a refractive index substantially the same as that of the glass substrate constituting the TFT substrates 2a, the connected portion does not become noticeable on the display screen.

Furthermore, since the liquid crystal layer 6 is provided independently per TFT substrate 2a, it is possible to control the cell gap of the liquid crystal layer 6 per TFT substrate 2a so that the entire display screen is natural. Thus, even in the case where a step-difference is generated at the connected portion, the display screen is not adversely affected.

Also, as described, the spacers 4 are made of the same resist which is the material of the sealant 3, and are provided within the region of the BM 12 on the CF substrate 1. The spacers 4 have a function of (a) maintaining a constant width (cell gap) of the liquid crystal layer 6 between the CF substrate 1 and the connected substrate 2 and (b) combining, in the same manner as the seal materials 3, the TFT substrates 2a and the CF substrate 1 with each other.

As mentioned above, the resist has pressure tightness. This is to maintain a predetermined thickness of the cell formed by the spacers 4 between the CF substrate 1 and the TFT substrates 2a, namely, due to the fact that it is required to maintain the cell gap of the liquid crystal layer 6 at a predetermined value. As the resist, for example, a UV curable resist having pressure tightness is adopted.

The spacers 4 may adopt a double-layered structure wherein an adhesive layer for combining the CF substrate 1 and the TFT substrates 2a with each other is formed on the resist. The spacers 4 may also adopt a single-layered structure made of a resist having adhesion. As described, since the spacers 4 itself is adhesive, the spacers 4 also have a function of combining, together with the seal materials 3, the two TFT substrates 2a and the CF substrate 1 with each other.

Thus, the CF substrate 1 and the TFT substrates 2a are combined not only by the seal materials 3 but also by the spacers 4. Note that, the material of the seal materials 3 and the spacers 4 is not limited to the above described resist, provided that the material has pressure tightness, can be formed finely by photolithography, and is capable of combining the CF substrate and the TFT substrates 2a with each other.

Conventionally, as the spacer, a bead spacer made of resin or silica has been widely adopted. The diameter of the bead spacer is significantly small (diameter substantially the same as the length of the cell gap of the liquid crystal layer), and a bead spacer having a diameter of substantially 5 μm is used when the cell gap of the liquid crystal layer 6 is 5 μm. Thus, the spacers are not recognized on the display screen by the observer, and the display screen is rarely adversely affected by the spacers. This allows the spacers to be randomly dispersed over the display screen region of the liquid crystal layer in a uniform density.

Here, larger the number of spacers used, more uniformly the cell gap is maintained with respect to the entire liquid crystal layer. However, in the above-mentioned liquid crystal layer, since the liquid crystal is not present where spacers are provided, the display screen is always paled and the level of black displaying is slightly reduced regardless of driving conditions of the liquid crystal. As a result, the contrast of the display screen is reduced.

For this reason, even though the spacers are not recognized on the display screen by the observer, it is required to limit the number of spacers dispersed. However, when the number of spacers are limited, the cell gap is not uniformly maintained sufficiently with respect to the entire liquid crystal layer. In particular, in an LCD having a large display screen, when the cell gap is not maintained with respect to the entire liquid crystal layer, the liquid crystal is unevenly distributed on the bottom of the display screen by the dead weight. This causes an adverse effect, such as nonuniform displaying, on the display screen.

In contrast, in the LCD 10 of the present embodiment, since the spacers 4 are made of resist which can be patterned by photolithography, the spacers 4 can be formed finely on predetermined positions. This enables the spacers 4 to be accurately positioned within the region of the BM 12, to be the non-displaying region, formed on the CF substrate 1. Thus, between the CF substrate 1 and the TFT substrates 2a, it is possible to provide the spacers 4 in the number which allows the cell gap to be uniformly maintained with respect to the entire liquid crystal layer 6 without adversely affecting the display screen.

Note that, provided that the spacers 4 are within the region of the BM 12, the shape of the spacers 4 is not particularly limited. Specifically, the spacers 4 may be provided in a linear pattern along the BM 12, with a pattern width within the region of the BM 12. Alternatively, the spacers 4 may be provided in an "island" pattern wherein layers of pillar-shaped resist are formed with certain intervals within a region shielded by the BM 12. Here, it is required that the area occupied by the spacers 4 per unit pixel area be substantially the same between the TFT substrates 2a.

Since the spacers 4 made of resist such as above are shielded by the non-transmissive pattern on the display screen, the display screen is not adversely affected by the spacers 4. As a result, it is possible to stably provide, compared with the conventional arrangement, larger numbers of spacers 4 without adversely affecting the display screen. Thus, the cell gap can be sufficiently maintained even in the liquid crystal layer 6 having a large area.

Further, the CF substrate 1 and the TFT substrates 2a are combined with each other by the spacers 4 together with the seal materials 3. Thus, compared with the conventional LCD, the CF substrate 1 and the TFT substrates 2a are uniformly combined with each other not only by the peripheries but also by the entire display screen region of the liquid crystal layer. Also, as described, the connected portion of the TFT substrates 2a is filled with the adhesive 5 so that the adhesive 5 contacts not only with the TFT substrates 2a but also with the CF substrate 1. Hence, the CF substrate 1 and the connected substrate 2 are combined with each other by the seal materials 3, the spacers 4, and the adhesive 5.

Therefore, in the LCD 10 of the present embodiment wherein the CF substrate 1 and the TFT substrates 2a are combined with each other, compared with the conventional LCD having a large screen, the cell gap of the liquid crystal layer 6 is maintained by a stronger structure. Thus, the cell gap is more uniformly maintained with respect to the entire liquid crystal layer 6, and even in the LCD 10 having a large display screen, it is possible to prevent the liquid crystal from being unevenly distributed on the bottom of the display screen by the dead weight, thus realizing a display screen capable of high quality displaying with no display nonuniformity.

Further, in the present embodiment, since the liquid crystal layer 6 is provided independently per TFT substrate 2a, the area of the liquid crystal layer 6 is not widened abruptly even when the LCD 10 is made larger. Therefore, in the liquid crystal layer 6, the uniformity of the entire cell gap is maintained more easily, thus realizing the LCD 10 having a large screen capable of quality displaying.

Also, the resist constituting the seal materials 3 and the spacers 4 are provided on the CF substrate 1. This is to disguise the connected portion of the TFT substrates 2a.

For example, in the case where the resist is provided on the TFT substrates 2a, there is a chance that the thickness of the resist differs at the connected portion of the TFT substrates 2a. Namely, when a slight step-difference or gap is present at the connected portion of the TFT substrates 2a, the thickness of the resist formed on the connected portion is adversely affected.

Particularly, when the thickness of the resist constituting the seal materials 3 is different by not less than 0.3 μm, the cell gap of the liquid crystal layer 6 is greatly changed at the connected portion. A change in the cell gap by such a large amount causes a change in color at the connected portion of the TFT substrates 2a, making the connected portion noticeable.

In contrast, when the resist is provided on the CF substrate 1, no step-difference by the connected small substrates is created, and differing thickness of the resist is not presented, thus preventing the connected portion from being noticeable, and realizing a high quality display screen.

In the LCD of the present embodiment having the described arrangement, no display nonuniformity is presented on the display screen and the aperture ratio is high. Further, even when the small substrates are connected to each other so as to realize a large screen, the connected portion of the small substrates does not become noticeable so that the display screen is prevented from looking unnatural, thus realizing an LCD having a large display screen with an improved displaying quality.

Note that, the described arrangement is suitably adopted in an arrangement wherein the pixels 8 have a stripe arrangement. When the pixels 8 have a delta arrangement, because the region of the BM 12 is not linear, it is difficult to adopt the described arrangement.

The following will describe a manufacturing method of the LCD in accordance with the present invention.

Figure 5:
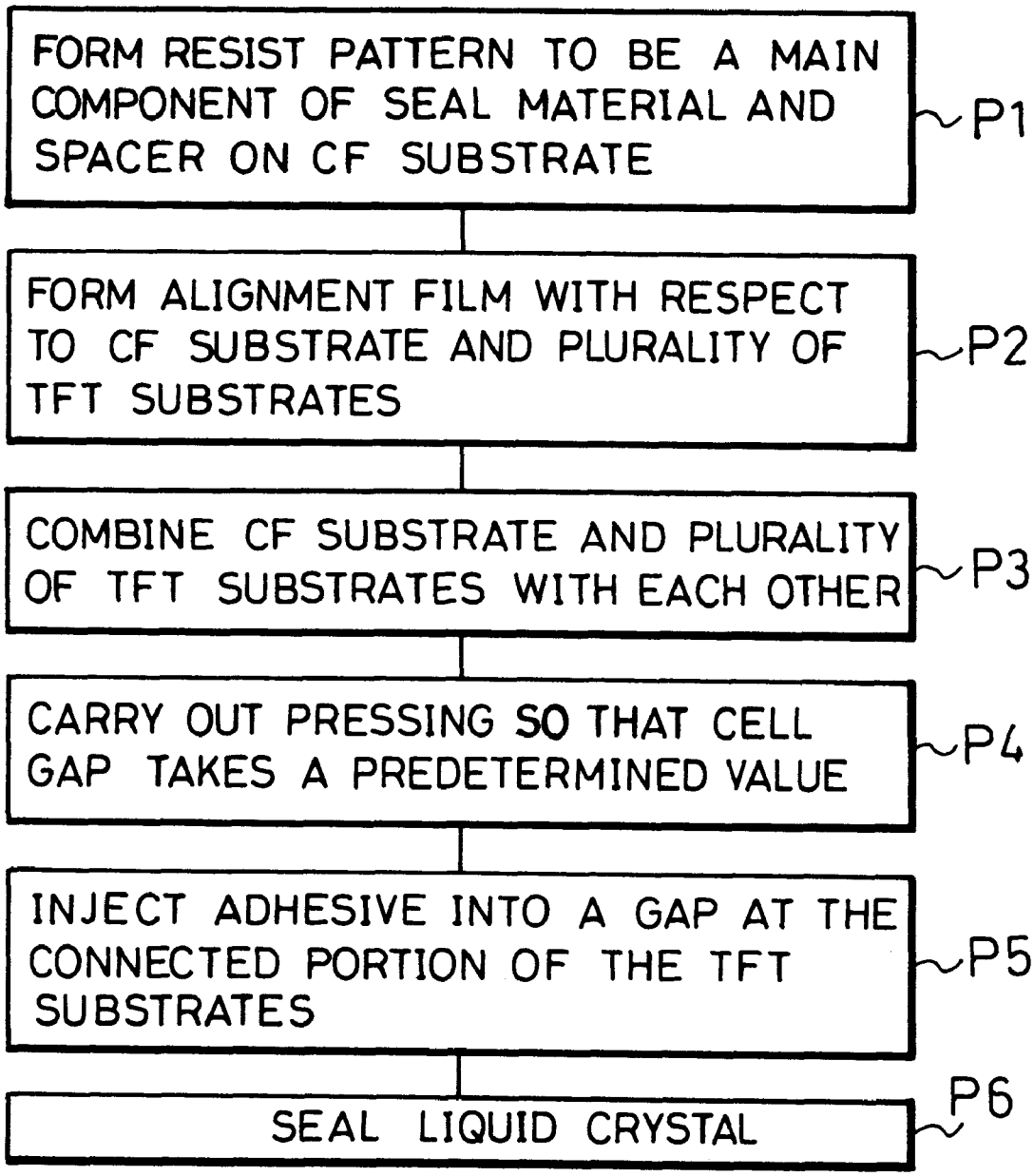
FIG. 5 is a drawing showing manufacturing steps in a manufacturing method of the liquid crystal display device of FIG. 1.

The manufacturing method of the LCD 10 in accordance with the present invention, as shown in FIG. 5, includes the following six basic steps.

First, as a first step (P1, step will be abbreviated to P hereinafter), a layer of resist to be the seal materials 3 and the spacer 4 is applied onto the CF substrate 1. Then, using a photomask having a predetermined pattern, the resist layer is exposed and developed so as to form at once a predetermined pattern of the resist to be the seal materials 3 and the spacers 4 on the CF substrate 1.

Here, in the case of forming a layer of adhesive with respect to the resist to be the seal materials 3 and the spacers 4, the resist is completely cured by post-baking. In the case where the resist has adhesion and thus a layer of adhesive is not formed, the resist is temporarily cured at a temperature of not more than the glass transition point. In either case, by the end of P1 and before proceeding to the next step, the resist is in the cured state.

Then, as a second step (P2), an alignment film is formed on respective surfaces of the CF substrate 1 and the plurality (two in the present embodiment) of TFT substrates 2a facing each other.

Thereafter, as a third step (P3), the TFT substrates 2a are faced with the CF substrate 1 in such a manner that the plurality of TFT substrates 2a constitute a single connected substrate 2 while being adjacent to each other on the sides, and the connected substrate 2 thus prepared is combined with the CF substrate 1. Here, it is required that the two TFT substrates 2a be combined with the CF substrate 1 so that the TFT substrates 2a correspond to the resist having the predetermined pattern formed on the CF substrate 1.

Then, as a fourth step (P4), the CF substrate 1 and the TFT substrates 2a are pressed against each other so as to set the thickness of a spacing therebetween, namely the cell gap of the liquid crystal layer 6 is set to a predetermined value. Thereafter, the layer of adhesive formed on the resist is cured, or the resist which is in a temporarily cured state is permanently cured so as to fix the CF substrate 1 and the TFT substrates 2a facing each other.

Here, the cured resist has a strength of substantially 0.7 kg/cm$^2$. In order to prevent the resist from being crushed by pressing, it is required that the resist has a strength of substantially 1.0 kg/cm$^2$. However, since pressing is carried out in P4 to set the cell gap, it is required to change the cell gap by slightly deforming the resist by pressing. Thus, it is preferable to set the strength of resist slightly lower than the required strength of 1.0 kg/cm$^2$.

Then, as a fifth step (P5), a gap at the connected portion of the plurality of TFT substrates 2a is filled with the adhesive 5 having a refractive index substantially the same as that of the material of the TFT substrates 2a.

Finally, as a sixth step (P6), liquid crystal is injected from the openings 15 which have been formed beforehand on the pattern of the seal materials 3, and the openings 15 are sealed by a sealant, thereby manufacturing the LCD 10 having a large display screen in accordance with the present invention.

In the described manufacturing method, in P1, the resist to be the seal materials 3 and the spacers 4 are formed as a development pattern using a photomask in one step. This allows the pattern of the spacers 4 and the pattern of the seal materials 3 to be formed as a photomask at once on the CF substrate 1, thus simplifying the manufacturing steps of the LCD 10.

Also, in the described manufacturing method, when combining the connected substrate 2 and the CF substrate 1 with each other, first in P3, the plurality of the TFT substrates 2a are combined with the CF substrate 1, and the connection is made in P5. Thus, it is possible to prevent complication in the manufacturing process in that the connected substrate 2 is required to be handled with care due to the fact that the structure of the connected substrate 2 is instable since the area connecting the TFT substrates 2a is small.

Also, in P4, when adopting a method in which the pressure inside the cell to be the liquid crystal layer 6 is reduced from the openings for injecting the liquid crystal so as to press against the substrates with each other by atmospheric pressure, it is possible to carry out pressing uniformly even when the area to be pressed is large. The pressing method by atmospheric pressure is preferable because it allows the cell gap to be made uniform when setting the cell gap of the liquid crystal layer 6 to a predetermined value.

Note that, although it is required that the alignment film be formed in P2 before combining the CF substrate 1 and the TFT substrates 2a in P3, the order is not particularly limited. For example, the alignment film may be formed before forming the resist layer in P1.

Also, as described, the seal materials 3 and the spacers 4 formed in P1 may have a single-layered structure, or a double-layered structure wherein a layer of adhesive is formed on the resist. As a method for forming these structures, for example, the following methods are available.

(1) A resist (for example, UV curable resist) is applied onto the CF substrate 1, and the resist is exposed and developed using a photomask so as to form a resist having a predetermined pattern. Thereafter, the resist is permanently cured by post-baking. Then, by atmospheric pressure pressing (mentioned later) or other pressing methods, the CF substrate 1 on which the resist has been formed and a transfer substrate whose surface on the side of the CF substrate 1 is applied with an adhesive are faced and combined with each other. By combining the two substrates in this manner, a layer of adhesive is transferred and formed on the resist, thus forming the seal materials 3 and the spacers 4 having the double-layered structure composed of the resist and the layer of adhesive.

(2) A resist having adhesion is applied onto the CF substrate 1, and the resist is temporarily cured at a temperature of not more than the glass transition point of the resist. Thereafter, the temporarily cured resist is exposed and developed using a photomask so as to form a resist having a predetermined pattern. Then, the CF substrate 1 and the TFT substrates 2a are combined with each other by the adhesion (viscosity) of the temporarily cured resist. Then, the temporarily cured resist is permanently cured by post-baking at a temperature of not less than the glass transition point, thus forming, by permanent curing, the spacers 4 entirely made of resist.

Here, in the spacer 4 having the double-layered structure, it is possible to form the layer of adhesive formed on the resist only through transferring by pressing against each other the transfer substrate and the CF substrate 1 formed with the resist. This prevents complication in the manufacturing process. As the pressing method, the pressing method by atmospheric pressure is preferable because it allows the layer of adhesive to be uniformly transferred onto the resist.

Note that, in the spacers 4 having the double-layered structure, the resist is not required to have adhesion; nevertheless, the resist may have adhesion. In the case where the resist has adhesion, since the layer of adhesive is provided, the structure made by combining the CF substrate 1 and the connected substrate 2 with each other is further reinforced, thus allowing the cell gap to be maintained even more uniformly with respect to the entire liquid crystal layer.

Also, in the above methods (1) and (2), the cell gap is set by atmospheric pressure while fixing the two substrates. Namely, in the method (1), the cell gap is set in the step of pressing against each other the CF substrate 1 and the TFT substrates 2a facing each other by atmospheric pressure after transferring and forming the layer of adhesive. Here, the resist of the seal materials 3 and the spacers 4 has already been cured by post-baking. Thus, the seal materials 3 and the spacers 4 do not protrude from a predetermined region even when subjected to pressing.

On the other hand, in the method (2), the CF substrate 1 and the TFT substrates 2a are combined with each other by the resist before post-baking. The two substrates are combined with each other by the adhesion of the resist. Thereafter, the substrates are pressed against each other by atmospheric pressure, and the resist which has been temporarily cured is post-baked while fixing the two substrates being pressed against and faced with each other. By the post-baking, the two substrates being faced with each other are completely fixed, and the cell gap is set.

Here, although the temporarily cured resist before pressing has viscosity capable of binding the substrates, the resist is temporarily cured at a temperature of not more than the glass transition point. For this reason, when the CF substrate 1 and the TFT substrates 2a are combined so as to be pressed against each other by atmospheric pressure, the resist of the seal materials 3 and the spacers 4 does not protrude from a predetermined region.

Also, even though the temporarily cured resist is cured to such a degree that the resist does not protrude from a predetermined region, the temporarily cured resist also has thermoplasticity to the degree that the resist is slightly deformed by pressing. For this reason, the temporarily cured resist formed on the CF substrate 1 is slightly deformed and spread, increasing the area to be bonded with the facing connected substrate 2, thus improving the bonding strength of the CF substrate 1 and the connected substrate 2.

Note that, the structure of the seal materials 3 and the spacers 4 is not limited to the structures described in the methods (1) and (2). Instead, if required, the seal materials 3 and the spacers 4 may have a multi-layered structure of three or more layers including a layer made of other materials.

As described, in the manufacturing method of the LCD 10 in accordance with the present embodiment, a resist having pressure tightness to be the seal materials 3 and the spacers 4 can be formed finely as a development pattern using a photomask in one step, thus simplifying the manufacturing steps of the LCD 10 and reducing the manufacturing cost.

Also, the resist to be the seal materials 3 and the spacers 4 may have a cured state when combining the CF substrate 1 and the connected substrate 2 composed of the TFT substrates 2a, thus preventing the resist to be the seal materials 3 and the spacers 4 from being spread and protruded from a predetermined pattern width even when the substrates are pressed against each other by atmospheric pressure or by other means.

Further, since the resist is formed finely as a development pattern using a photomask, at the connected portion of the TFT substrates 2a, it is possible to form the seal materials 3 in a vicinity of the display screen region and within the region of the BM 12 which is a non-transmissive pattern.

Therefore, the aperture ratio of the product LCD 10 is not reduced, and the connected portion of the TFT substrates 2a does not become noticeable. Also, compared with the conventional arrangement, the cell gap is maintained with more ease with respect to the entire area, thus providing the LCD 10 having a large display screen and a high displaying quality at lower costs without complicating the manufacturing process.

Also, the described steps are basic steps which are the minimum numbers of steps required for manufacturing of the LCD in accordance with the present invention, and therefore in the manufacturing method of the LCD in accordance with the present invention, it is possible to add a variety of other steps appropriately in accordance with the types of LCD to be manufactured.

The following will describe in more detail the manufacturing method of the LCD in accordance with the present embodiment based on specific Examples 1 through 3 and Comparative Example.

Note that, for convenience of explanation, in FIG. 6(a) through FIG. 6(d), FIG. 7(a) through FIG. 7(d), and FIG. 8(a) through FIG. 8(e) used in the following explanations, the resist to be the seal materials 3 is indicated in a pattern width which is wider than the actual pattern width.

EXAMPLE 1

First, as shown in FIG. 6(a), on the CF substrate 1 provided at least with the CF, the BM, and the common electrodes (all not shown), a UV curable resist (negative type in the present embodiment) was applied so as to form a resist layer 4a. Thereafter, exposure and development were carried out using a photomask, and the CF substrate 1 formed with the resist layer 4a was heated in an oven so as to be post-baked. This resulted in, as shown in FIG. 6(b), a cured resist 4c and a cured resist 4d to be the seal materials 3 and the spacers 4, respectively (P1).

Here, the pattern of the cured resist 4c corresponds to the shape of the two TFT substrates 2a, and is provided with the openings (not shown) for injecting the liquid crystal in the later step. Also, the pattern of the cured resist 4d corresponds to the BM provided on the CF substrate 1.

The cured resist 4c is provided in such a manner that the width thereof to be the seal materials 3 on the outer frame is 100 μm, and that the width thereof to be the seal materials 3 at the connected portion of the TFT substrates 2a is 50 μm. Also, the cured resist 4d is provided such that the width thereof is 300 μm corresponding to the width of the BM 12. The cured resists 4c and 4d are provided such that the respective thickness thereof is 5.0 μm, coinciding with the thickness (cell gap) of the liquid crystal layer 6 to be formed in the later step.

Thereafter, on respective surfaces of the CF substrate 1 provided with the cured resists 4c and 4d and the TFT substrates 2a faced and combined with the CF substrate 1, an alignment film (not shown) was applied, and a rubbing process was carried out after baking with respect to the CF substrate 1 and the TFT substrates 2a applied with the alignment film (P2).

Then, as shown in FIG. 6(c), a transfer substrate 16 applied with an adhesive layer 4b was faced with the CF substrate 1. After combining the transfer substrate 16 and the CF substrate 1 with each other by vacuum pressing, the transfer substrate 16 was removed. As a result, as shown in FIG. 6(d), the adhesive layer 4b was transferred onto the cured resists 4c and 4d formed on the CF substrate 1. By transferring of the adhesive layer 4b, there were formed (a) the seal materials 3 composed of the cured resist 4c and the adhesive layer 4b and (b) the spacers 4 composed of the cured resist 4d and the adhesive layer 4b.

Figure 7A:
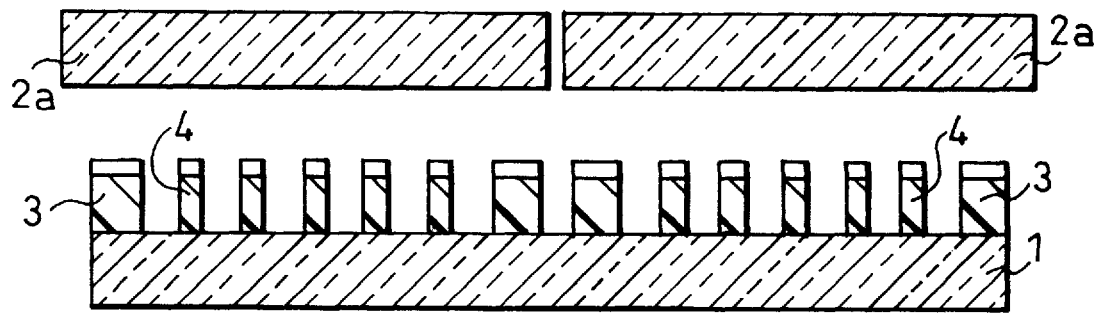
FIG. 7(a) through FIG. 7(d) are drawings illustrating the manufacturing steps in the manufacturing method of liquid crystal display device of FIG. 1, continuing from FIG. 6(a) through FIG. 6(d).

Then, as shown in FIG. 7(a), the two TFT substrates 2a being adjacent to each other on the sides with respect to the CF substrate 1 were faced and combined with the CF substrate 1 provided with the seal materials 3 and the spacers 4 (P3). Here, the TFT substrates 2a were combined with the CF substrate 1 in accordance with the pattern of the seal materials 3 formed in the previous step.

Figure 7B:
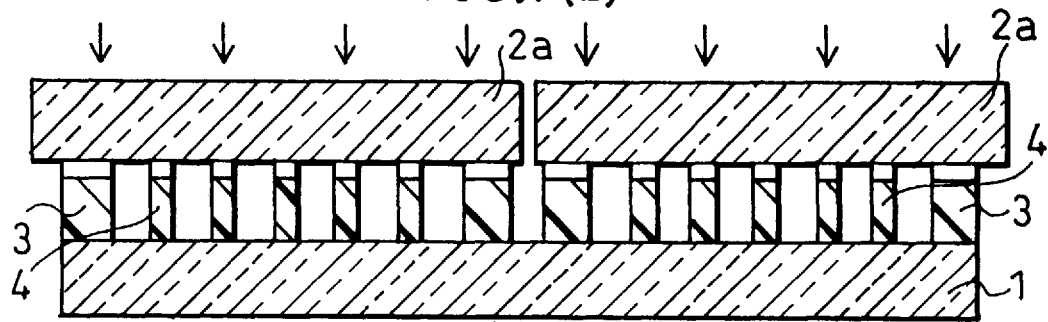

In the cell formed by the two TFT substrates 2a and the CF substrate 1 combined with each other, the pressure inside the cell was reduced from the openings (not shown) provided on the pattern of the seal material 3. By the reduction in pressure, as shown in FIG. 7(b), the CF substrate 1 and the connected substrate 2 composed of the TFT substrates 2a were pressed against each other by atmospheric pressure (P4).

In the pressing process, the cell gap of the liquid crystal layer, which is the width of the spacing between the TFT substrates 2a and the CF substrate 1, was set to 5.0 μm. When a predetermined value of the cell gap is reached by the pressing process, the substrates facing each other were subjected to and maintained at high temperature. This promoted curing of the adhesive layer 4b and completely fixed the CF substrate 1 and the TFT substrates 2a combined with each other.

Figure 7C:
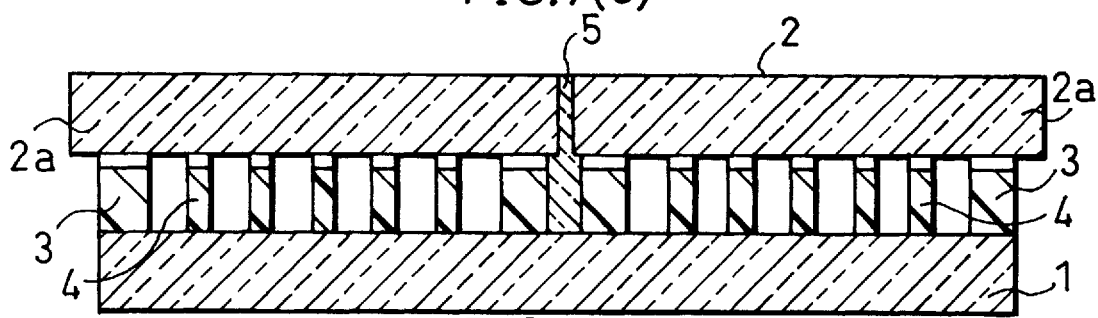

Then, in order to connect to each other the two TFT substrates 2a combined with the CF substrate 1, as shown in FIG. 7(c), a gap between the two TFT substrates 2a was filled with the adhesive 5 of a UV curable type (P5).

Figure 7D:
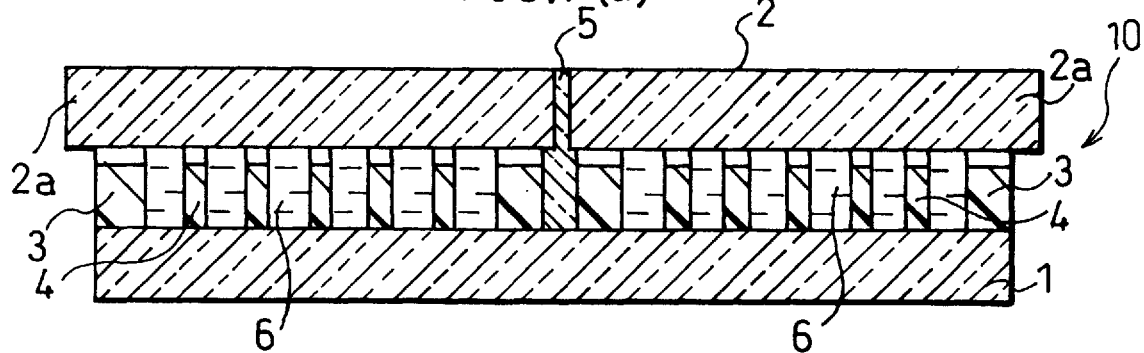

Thereafter, as shown in FIG. 7(d), liquid crystal was injected through the openings provided on the pattern of the seal materials 3 so as to form the liquid crystal layer 6 (P6), and the openings were sealed by a sealant (not shown), thus finishing the manufacturing of the LCD 10 in accordance with the present invention.

EXAMPLE 2

The LCD 10 of the present invention was manufactured by the same conditions and steps as that of Example 1 except that the alignment film was formed with respect to the CF substrate 1 and the TFT substrates 2a (P2) before forming the resist layer 4a (P1).

EXAMPLE 3

Figure 8A:
FIG. 8(a) through FIG. 8(e) are drawings illustrating manufacturing steps in another manufacturing method of liquid crystal display device of FIG. 1.

First, as shown in FIG. 8(a), on the CF substrate 1 provided at least with the CF, BM, and the common electrodes, a resist layer 14a which is a UV curable resist of a negative type having pressure tightness and adhesion was applied. Thereafter, the CF substrate 1 was put in an oven and was heated at a temperature of not more than the glass transition point of the resist so as to temporarily cure the resist layer 14a.

Figure 8B:

Then, the temporarily cured resist 14a was exposed and developed using a photomask so as to form, as shown in FIG. 8(b), a temporarily cured resist 14c to be the seal materials 3 and a temporarily cured resist 14d to be the spacers 4 (P1). Here, the pattern of the temporarily cured resists 14c and 14d are the same as the pattern of the temporarily cured resists 4c and 4d of Example 1.

Thereafter, on respective surfaces of the CF substrate 1 provided with the temporarily cured resists 14c and 14d and the TFT substrates 2a faced and combined with the CF substrate 1, an alignment film (not shown) was applied, and a rubbing process was carried out after baking with respect to the CF substrate 1 and the TFT substrates 2a applied with the alignment film (P2).

Figure 8C:
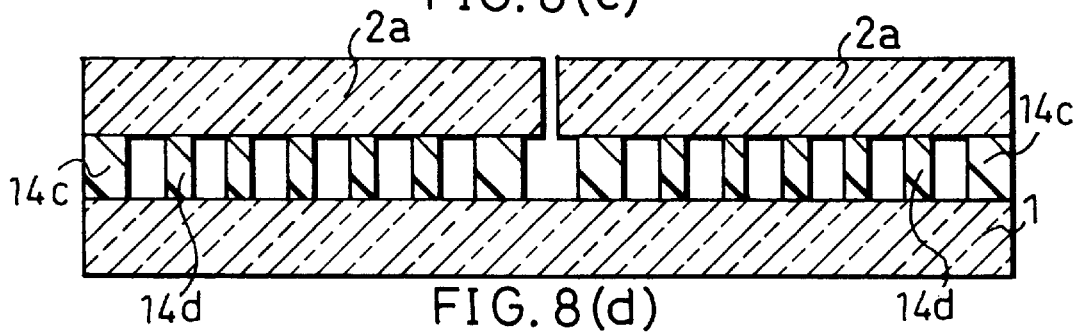
Figure 8D:
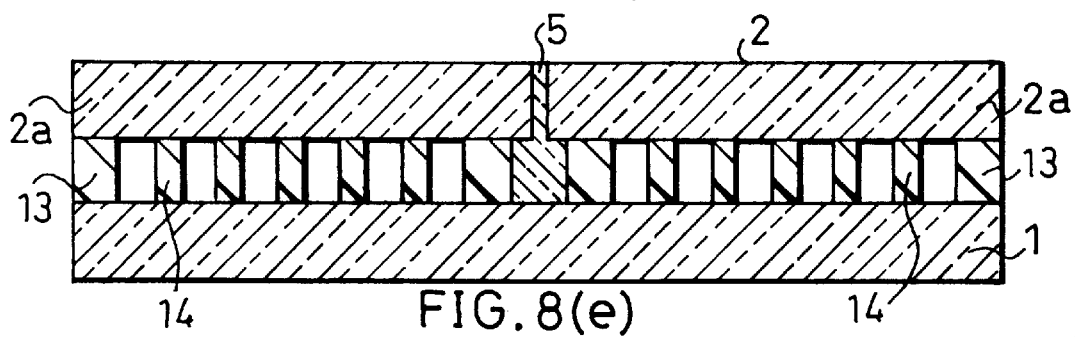
Figure 8E:
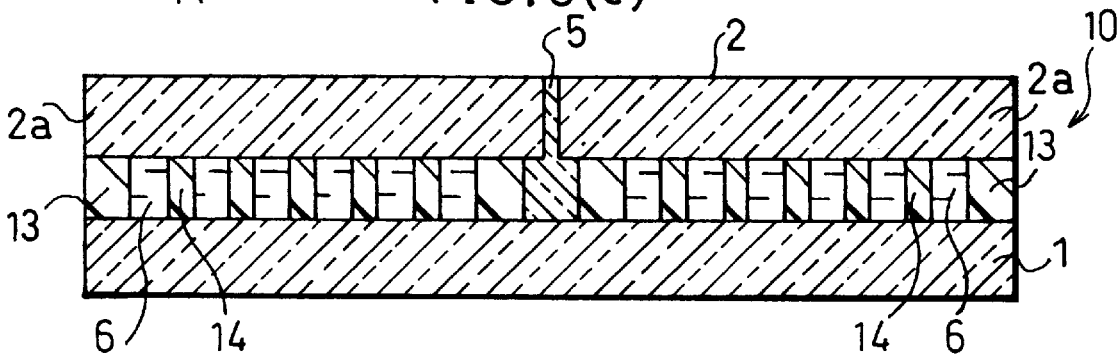

Then, as shown in FIG. 8(c), the two TFT substrates 2a being adjacent to each other on the sides with respect to the CF substrate 1 were faced and combined with the CF substrate 1 provided with the temporarily cured resists 14c and 14d (P3). Thereafter, as in Example 1, the substrates were pressed against each other by atmospheric pressure (P4).

In the pressing process, the cell gap of the liquid crystal layer, which is the width of the spacing between the TFT substrates 2a and the CF substrate 1, was set to 5.0 μm. While maintaining the cell gap of 5.0 μm, the substrates were combined with each other by the viscosity of the temporarily cured resists 14c and 14d so as to be temporarily fixed.

Then, the substrates being temporarily fixed were again heated in the oven and post-baked so as to permanently cure the temporarily cured resists 14c and 14d binding the substrates. As a result of permanent curing, the seal materials 3 and the spacers 4 were formed, and the CF substrate 1 and the TFT substrates 2a combined with each other were completely fixed. Hence, in Example 2, the step in Example 1 of transferring and forming the adhesive layer 4b is omitted.

Then, in order to connect to each other the two TFT substrates 2a combined with the CF substrate 1, as shown in FIG. 8(*d*), a gap between the two TFT substrates 2a was filled with the adhesive 5 of a UV curable type (P5). Thereafter, as shown in FIG. 8(*e*), liquid crystal was injected through the openings provided on the pattern of the seal materials 3 so as to form the liquid crystal layer 6 (P6), and the openings were sealed by a sealant (not shown), thus finishing the manufacturing of the LCD 10 in accordance with the present invention.

COMPARATIVE EXAMPLE

As Comparative Example, an LCD was manufactured in the same conditions and steps as that of Example 1 except that the pattern of the resist formed on the CF substrate 1 in P2 is a pattern of either the spacers 4 or the spacers 14, and as the seal materials 3 or the seal materials 13, a pattern to be the seal materials 3 was profiled on the CF substrate 1 using an applied-type resin which has conventionally been used as a seal material.

In the LCD 10 in accordance with the present invention manufactured by the above Examples 1 through 3, the resist to be the seal materials is prevented from being spread from a predetermined pattern width when setting the cell gap. Namely, in Examples 1 and 2, when pressing the substrates against each other, the seal materials 3 are composed of the cured resist 4c and the adhesive layer 4d, and in Example 3, the seal materials 13 are made of the temporarily cured resist 14c. Thus, in pressing in P4, the cured resist 4c or the temporarily cured resist 14c is in the cured state, and therefore the shape of the seal materials 3 or the seal materials 13 is not easily changed.

In this manner, since the cured resist 4c or the temporarily cured resist 14c is prevented from being spread from a predetermined pattern width in pressing, at the connected portion of the TFT substrates 2a, it is possible to position the pattern width of the seal materials 3 as far as on the edge of the BM 12 on the side of the pixel 8. Thus, as the BM 12, which is a non-displaying region, it is possible to adopt a BM having the same width as that of a BM which has been used conventionally.

Further, in the LCD 10 of Examples 1 through 3, the resist to be the spacers 4 or 14 can be formed finely within the region of the BM 12 which is a non-displaying region on the CF substrate 1. As a result, it is possible to form the spacers 4 (Examples 1 and 2) or the spacers 14 (Example 3) in the number capable of uniformly maintaining a sufficient cell gap with respect to the entire liquid crystal layer 6 without adversely affecting the display screen.

Also, in the LCD 10 of Examples 1 through 3, the CF substrate 1 and the TFT substrates 2a are combined with each other not only by the seal materials but also by the spacers. Thus, compared with the conventional LCD, the structure of the CF substrate 1 and the TFT substrates 2a combined with each other is further reinforced, thus uniformly maintaining the cell gap with respect to the entire liquid crystal layer 6.

Also, in the manufacturing method of the LCD 10 of Examples 1 through 3, the spacers and the seal materials are formed as a single pattern in one step, thus reducing the number of the manufacturing steps of the LCD 10.

Namely, in the LCD 10 in accordance with the present invention obtained by the manufacturing methods of Examples 1 through 3, compared with the conventional LCD, it is possible to uniformly maintain the cell gap with respect to the entire liquid crystal layer even in a large screen. Also, in the manufacturing step, the pattern width of the seal materials 3 do not spread, and therefore it is not required to widen the region of the BM 12, thus increasing the aperture ratio of the pixels on the display screen compared with the conventional arrangement.

In contrast, in the LCD of Comparative Example, at the connected portion of the TFT substrates 2a, the resin to be the seal materials 3 protrudes into the image display region of the liquid crystal layer 6. The protruded resin adversely affects the display screen, and induces disturbance in the alignment of the liquid crystal. As a result, compared with the LCD 10 of Examples 1 through 3, the displaying quality of the LCD of Comparative Example is lower.

As described, in the LCD of Examples 1 through 3, the aperture ratio of the pixels is prevented from lowering, thus obtaining an LCD having a large screen and a high displaying quality. Also, it is possible to reduce the manufacturing cost without complicating the manufacturing process.

Note that, in Examples 1 through 3, although the explanations are given through the case of connecting side by side two small substrates of active-matrix type using TFT as an active element, the number of small substrates is not particularly limited. Also, the manufacturing method of the large screen LCD of the present invention is not limited to the LCD of active-matrix type using TFT so that other types of LCD such as an LCD of active-matrix type using MIM, an LCD of simple-matrix type, and an LCD of flat display type; and other types of flat display devices such as a plasma display device (PDP) and a field emission display device (FED) may be adopted.

As described, the LCD in accordance with the present invention has an arrangement wherein a large substrate provided with a matrix non-transmissive pattern and a single connected substrate composed of a plurality of small substrates being connected to each other side by side are faced each other and a liquid crystal layer is sandwitched therebetween, and a seal material for combining the large substrate and the connected substrate and a spacer for maintaining a predetermined value for the thickness of the liquid crystal layer sandwitched between the large substrate and the connected substrate are made of resist.

With this arrangement, since the seal material and the spacer are made of resist, when setting the cell gap by pressing against each other the large substrate and the connected substrate, the resist to be the seal material can be provided in a cured state. Since the resist is in a cured state, in the pressing process, the resist does not spread from the pattern width by pressing, and the region to be provided with the seal material does not protrude into the display screen region. Namely, in the manufacturing process of the LCD, the seal material made of resist has a stable shape in which the shape of the seal material is not changed more than necessary.

Further, since the seal material is made of resist, the seal material can be finely formed. This allows, at the connected portion of the small substrates, the seal material to be formed in a vicinity of the display screen region. Thus, at the connected portion, it is not required to widen the region of the non-transmissive pattern in order to shield the resin (in this case, resist) to be the seal material.

Therefore, in the product LCD, the aperture ratio of the pixels is prevented from being lowered, and it is possible to increase the contrast and the resolution of the display screen, thus providing an LCD having a large screen and high displaying quality without noticeable connected portion.

Also, since not only the seal material but the spacer is made of resist, it is possible to finely form in one step the seal material and the spacer as a development pattern using a photomask. Particularly, the spacer can be formed within the region of the non-transmissive pattern so that the spacer is shielded by the non-transmissive pattern on the display screen, thus preventing an adverse effect of the spacer on the display screen.

As a result, it is possible to form the spacer on a stable position in larger numbers than the conventional arrangement without adversely affecting the display screen. Thus, sufficient numbers of spacers can be formed even when the area of liquid crystal layer is increased as a result of enlarging the LCD screen and therefore it is difficult to maintain a uniform cell gap with respect to the entire liquid crystal layer. This prevents the liquid crystal from being unevenly distributed on the bottom of the screen which is caused by the fact that the cell gap is not sufficiently maintained, thus obtaining an LCD capable of high quality displaying without display nonuniformity.

The LCD in accordance with the present invention, in addition to the above arrangement, has an arrangement wherein the resist has adhesion.

With this arrangement, since the resist has adhesion, the connected substrate and the large substrate are combined with each other not only by the seal material but also by the spacer. Thus, the combined structure of the substrates is stabilized, and even in a liquid crystal layer having a large area, it is possible to sufficiently maintain the cell gap.

Also, the resist is cured to such a degree that the resist has thermoplasticity which prevents the resist from protruding from a predetermined region but allows the resist to be slightly deformed by pressing. The slightly deformed resist by pressing increases the area to be bonded with the facing substrate, thus increasing the bonding strength of the combined substrates. As a result, the liquid crystal is prevented from being unevenly distributed on the bottom of the screen, thus obtaining an LCD having high displaying quality without display nonuniformity.

Further, since the resist itself has adhesion, in order to combine the substrates, it is not required to additionally provide, for example, a layer of adhesive on the resist, thus preventing complication in the manufacturing process. As a result, it is possible to simplify the structure of the product LCD, and reduce the manufacturing cost.

The LCD in accordance with the present invention, in addition to the above arrangement, has an arrangement wherein the spacer is provided with a layer of adhesive.

With this arrangement, even when the resist does not have adhesion, adhesion is given to the seal material and the spacer by the layer of adhesive. Also, even when the resist has adhesion, by the layer of adhesive, it is possible to ensure the adhesion of the seal material and the spacer. As a result, the combined structure of the large substrate and the connected substrate is further reinforced, allowing the cell gap to be more uniformly maintained with respect to the entire liquid crystal layer.

The LCD in accordance with the present invention, in addition to the above arrangement, has an arrangement wherein the liquid crystal layer is divided by the seal material with respect to each of the plurality of small substrates.

With this arrangement, in order to prevent the entire display screen of the product liquid crystal display device to look unnatural, namely, in order to prevent the display screen from being adversely affected by the step-difference at the connected portion of the small substrates, the cell gap of the liquid crystal layer is controlled individually with respect to each of the small substrates. Also, since the area of the liquid crystal layer can be regarded as the area of each small substrate, the uniformity of the entire cell gap is more easily maintained by the spacer made of resist, thus providing an LCD having a larger screen and higher displaying quality.

The LCD in accordance with the present invention, in addition to the above arrangement, has an arrangement wherein the connected substrate is a substrate which is made by connecting the plurality of small substrates with a connection gap within a region of the matrix non-transmissive pattern.

With this arrangement, since the seal material formed at the connected portion is made of resist, at the connected portion, the resist to be the seal material does not spread into the display screen region, and the pattern of the seal material is formed accurately with finer pattern width. Thus, it is not required to widen the region of the non-transmissive pattern.

Therefore, since the connection gap of the connected portion is within the region of the non-transmissive pattern, it is possible to uniformalize the pixel pitch of the display screen with respect to the entire display screen without lowering the aperture ratio of pixels. As a result, the display screen is prevented from being adversely affected by the connected portion, and an LCD having a large screen capable of high quality displaying is realized.

The LCD in accordance with the present invention, in addition to the above arrangement, has an arrangement wherein the connection gap between the plurality of small substrates of the connected substrate is filled with resin whose refractive index is substantially equal to the refractive index of the material of the plurality of small substrates.

With this arrangement, since the large substrate and the connected substrate are combined with each other not only by the seal material and the spacer but also by the adhesive at the connected portion of the small substrates, the combined structure of the large substrate and the connected substrate is further reinforced, particularly at the connected portion of the small substrates, allowing the cell gap to be more uniformly maintained with respect to the entire liquid crystal layer.

Since the adhesive has a refractive index substantially the same as that of the material of the small substrates, refracting and scattering of light is prevented between the small substrates and at the connected portion, thus preventing the adverse effect of the connected portion on the display screen.

The LCD in accordance with the present invention, in addition to the above arrangement, has an arrangement wherein the resist constituting the seal material and the spacer is formed on the large substrate.

When the resist to be the seal material and the spacer is formed on the small substrates, there is a case that the thickness of the resist differs at the connected portion of the small substrates due to the step-difference. However, with the described arrangement, by forming the resist on the large substrate, the thickness of the resist is made constant. As a result, it is possible to prevent an adverse effect such as a change in color caused by differing thickness of the resist, thus realizing a high quality display screen without noticeable connected portion.

Further, the manufacturing method of the LCD in accordance with the present invention includes the steps of forming a resist to be a seal material and a spacer in a predetermined pattern in a cured state on a large substrate having a non-transmissive pattern formed in matrix; combining a plurality of small substrates with the large substrate provided with the resist in such a manner that the plurality of small substrates constitute a single connected substrate by being adjacent to one another side by side; and setting a thickness of a spacing between the large substrate and the connected substrate to a predetermined value by pressing against each other the large substrate and the connected substrate facing each other.

In this manufacturing method, when pressing against each other the substrates for setting the cell gap, the seal material and the spacer are formed as a cured resist. Since the shape of the resist is stabilized by being cured, when the substrates are pressed against each other, the resist to be the seal material is prevented from spreading from a predetermined pattern width and protruding into the display screen region. In the same manner, the spacer is also prevented from spreading from a predetermined pattern width, and, for example, protruding into the display screen region from the non-transmissive pattern. As a result, it is not required to take into account protrusion of the seal material and the spacer by widening the region of the non-transmissive pattern for shielding of the seal material and the spacer, thus improving the aperture ratio of pixels.

Further, in the above method, when combining the connected substrate and the large substrate with each other, the connection of the plurality of two small substrates is made after combining the plurality of small substrates with the large substrate. Thus, compared with the case where the plurality of two small substrates are combined with each other after the small substrates are connected to one another, the structure of the connected substrates is not destabilized due to the fact that the area connecting the small substrates is small, thus preventing complication in the manufacturing process that the connected substrate is required to be handled with care.

The manufacturing method of the LCD in accordance with the present invention, in addition to the above manufacturing method, further includes the step of transferring and forming a layer of adhesive on the resist by combining with each other the large substrate and a transfer substrate applied with an adhesive on a surface contacting the large substrate.

With this manufacturing method, since the layer of adhesive is formed only through transferring by pressing against each other the transfer substrate and the large substrate provided with the resist, it is possible to prevent complication in the manufacturing process.

In the manufacturing method of the LCD in accordance with the present invention, in the above manufacturing method, the substrates facing each other are pressed against each other by atmospheric pressure.

With this manufacturing method, when combining the large substrate and the small substrates, it is possible to combine the two substrates with each other with a substantially uniform cell gap with respect to the entire substrates including the connected surfaces of the small substrates, thus further uniformalizing the cell gap with respect to the entire liquid crystal layer of the product LCD. Also, even in the case of transferring the layer of adhesive, it is possible to press against each other the large substrate and the transfer substrate more uniformly with respect to the entire substrates, thus also uniformalizing the transferred adhesive layer.

Second Embodiment

The following will describe another embodiment of the present invention referring to attached drawings. Note that, members having the same functions as the members indicated in First Embodiment are given the same reference numerals, and explanations thereof are omitted.

The LCD and the manufacturing method thereof in accordance with the present invention is suitably adopted in a large screen by connecting a plurality of small substrates (TFT substrates) with one another as in First Embodiment. However, the LCD and the manufacturing method thereof in accordance with the present invention is not limited to this arrangement so that an LCD made from a single TFT substrate may also be adopted.

Specifically, for example, an LCD 30 of the present embodiment has an arrangement wherein, as shown in FIG. 9, a pair of substrates including electrodes, in this case, a CF substrate 31 and a TFT substrate 32 are faced each other one by one so as to sandwich a liquid crystal layer 35 therebetween, and (a) a seal material 33 for combining the CF substrate 31 and the TFT substrate 32 with each other and for sealing the liquid crystal layer 35 and (b) spacers 34 for maintaining the cell gap of the liquid crystal layer 35 are respectively provided with resists having the same pressure tightness. The spacers 34 are provided within the region of a BM 36 which is a non-transmissive pattern formed in matrix.

In this manner, since the seal material 33 and the spacers 34 are made of resist, it is possible to finely form the seal material 33 and the spacers 34 as a development pattern using a photomask in one step. This allows the spacers 34 to be formed on a position which can be shielded by the BM 36, and the spacers 34 to be formed in the number capable of maintaining a sufficient cell gap without causing an adverse effect on the display screen.

Therefore, it is possible to stabilize the structure of the product LCD, and prevent lowering of displaying quality due to uneven distribution of the liquid crystal. As a result, an LCD having a high displaying quality can be provided without complicating the manufacturing process.

Also, the LCD and the manufacturing method thereof can be adopted for an LCD of multi-panel type (not shown) in which a liquid crystal panel is formed by combining with each other a pair of substrates having electrodes with a liquid crystal layer therebetween, and a plurality of such liquid crystal panels are connected to one another so as to realize a large screen.

As described, the LCD in accordance with the present invention has an arrangement wherein a pair of substrates having electrodes are faced and combined with each other, and a liquid crystal layer is sandwitched therebetween, and a seal material for combining the large substrate and the connected substrate and a spacer for maintaining a predetermined value for the thickness of the liquid crystal layer sandwitched between the large substrate and the connected substrate are made of resist having pressure tightness.

With this arrangement, since the seal material and the spacer are both made of resist, it is possible to finely form in one step the seal material and the spacer as a development pattern using a photomask. This allows the spacer to be formed within the region of the non-transmissive pattern with ease in the number capable of maintaining a sufficient cell gap without causing an adverse effect on the display screen, thus stabilizing the structure of the product LCD, and preventing lowering of displaying quality due to uneven distribution of the liquid crystal.

Third Embodiment

The following will describe yet another embodiment of the present invention referring to attached drawings. Note that, members having the same functions as the members indicated in First Embodiment and Second Embodiment are given the same reference numerals, and explanations thereof are omitted.

Figure 10:
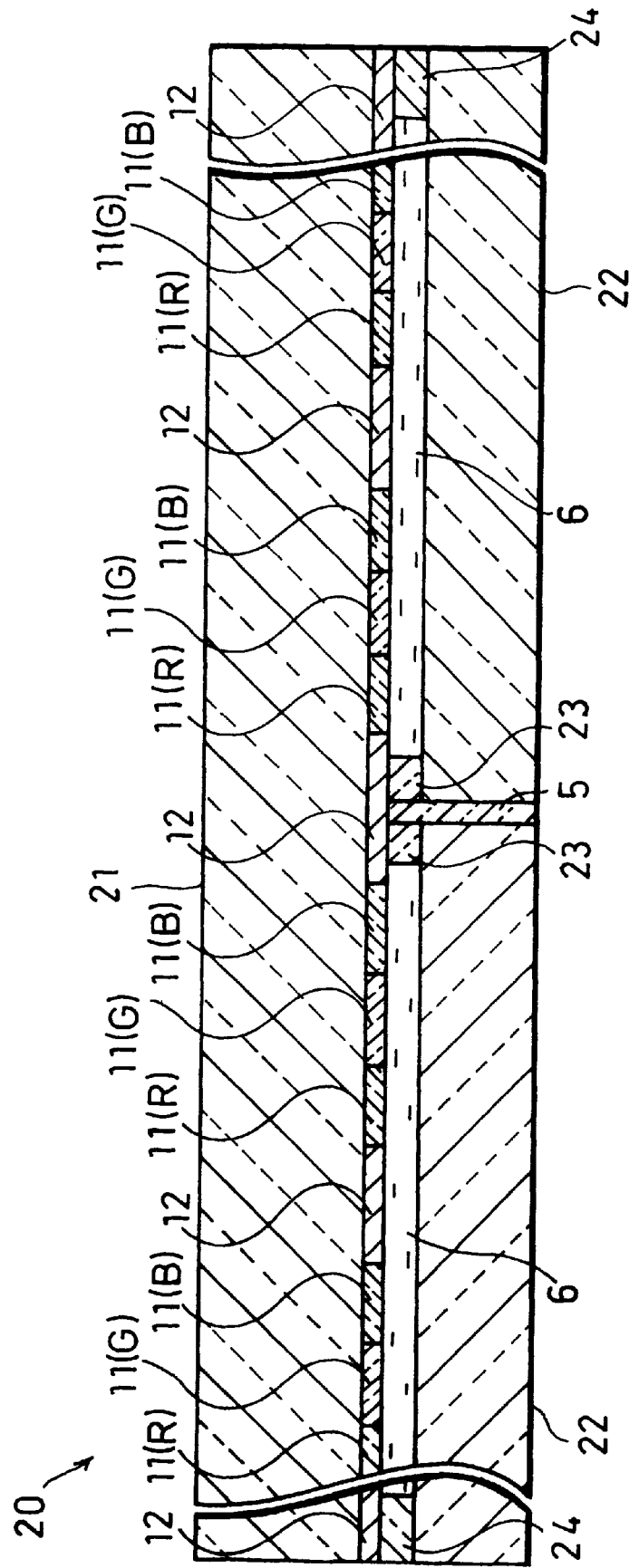
FIG. 10 is a cross sectional view showing a schematic arrangement of a liquid crystal display device in accordance with Third Embodiment of the present invention.
Figure 11:
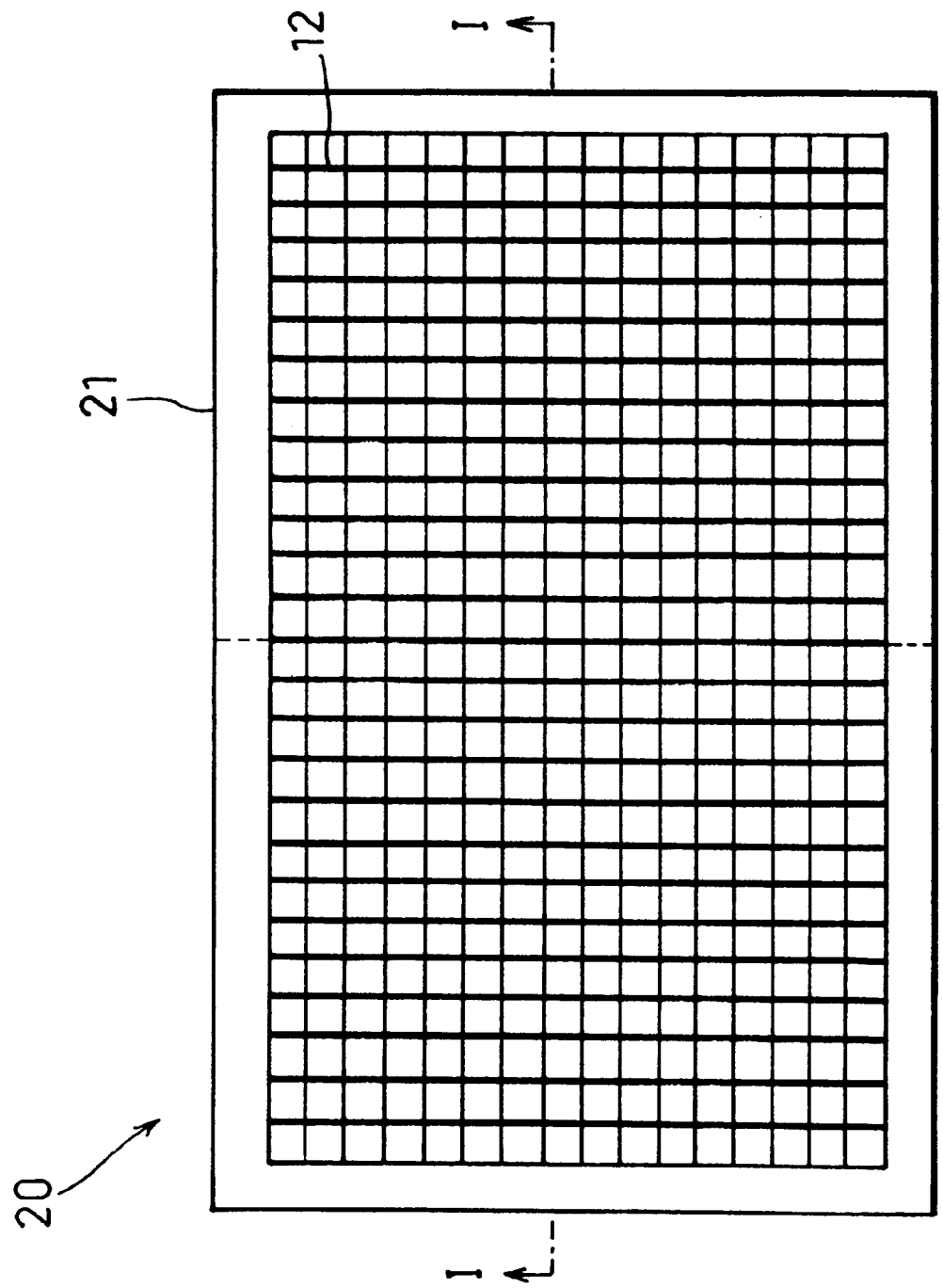
FIG. 11 is a plan view of the liquid crystal display device of FIG. 10 as viewed from a displaying direction.

FIG. 11 is a plan view of an LCD 20 in accordance with Third Embodiment of the present invention as viewed from the displaying direction, and FIG. 10 is a cross sectional view of FIG. 11 taken along the line I—I. The LCD 20 is provided with (a) a CF substrate (counter substrate) 21 having CF and (b) two TFT substrates (small substrates) 22 having TFT as an active element.

In general, manufacturing of a TFT substrate requires fine processing of a semiconductor film, and therefore the yield is abruptly decreased when the TFT substrate is made larger. Thus, as in the present embodiment, a method in which the TFT substrates 22 are formed, each with a size half the target size, and a large substrate is realized by connecting the TFT substrates 22 thus prepared is extremely effective in terms of reducing the cost.

The TFT substrates 22 are combined with the CF substrate 21 by seal materials 23 (first seal materials) and seal materials 24 (second seal materials) provided on peripheries of the surfaces of the TFT substrates 22 facing the CF substrate 21. Also, between the TFT substrates 22 and the CF substrate 21, liquid crystal layers 6 are provided. The connected portion of the TFT substrates 22 is filled with a transparent adhesive 5 so that the connected portion does not become optically noticeable.

The CF substrate 21 is provided with three CFs respectively corresponding to red (R), green (G), and blue (B), BM 12, common electrodes (not shown), and an alignment film (not shown), etc. The TFT substrates 22 are provided with matrix electric wiring, TFT, pixel electrodes, and an alignment film (all not shown), etc. Note that, as shown in FIG. 11, the BM 12 is formed in a grid manner surrounding the pixels. Also, the BM 12 on the outermost periphery of the grid is the boarder separating the display region (inside) from the non-display region (outside).

Figure 12:
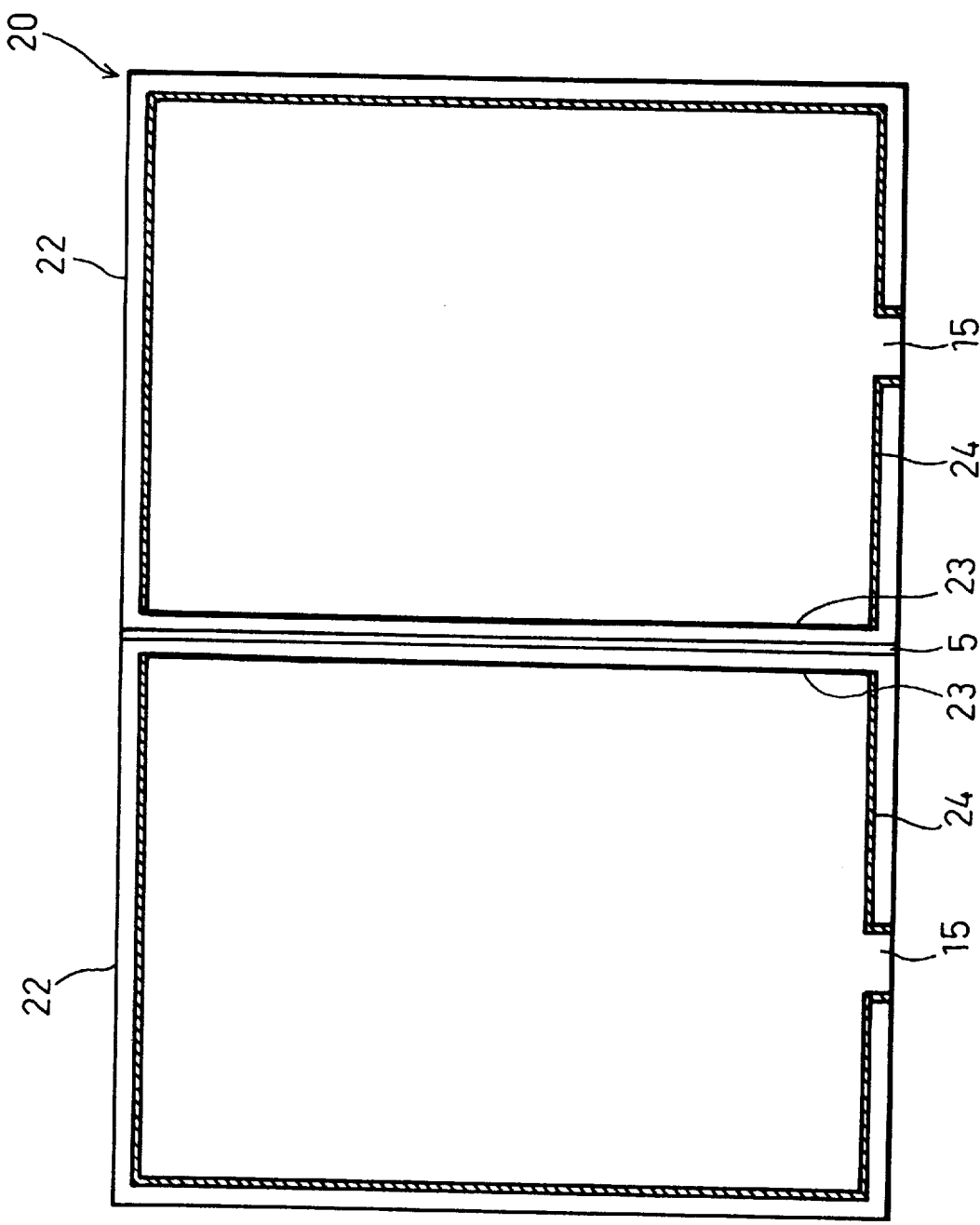
FIG. 12 is a plan view showing positions of seal materials on TFT substrates of the liquid crystal display device of FIG. 10.

FIG. 12 is a plan view showing the positions of the seal materials 23 and 24 on the TFT substrates 22. On the periphery of each TFT substrate 22, a seal material 23, provided along the connected portion of the TFT substrates 22, is formed by patterning a photoresist having adhesion (referred to as adhesive resist hereinafter), and a seal material 24, provided on the other portions of the periphery, is made of an epoxy heat curable adhesive. Namely, on each TFT substrate 22, the seal material 23 is provided so as to vertically traverse the display region, and the seal material 24 is provided in substantially U-shape outside the display region. Note that, the seal materials 24 are provided with liquid crystal injection openings (openings) 15 for injecting liquid crystal after combining the TFT substrates 22 and the CF substrate 21.

The adhesive resist is a photoresist having photosensitivity, and as a material of such resist, a resist whose adhesion or viscosity is increased by polymerization as initiated by heating and irradiation of UV light is adopted. Also, since the adhesive resist is brought into direct contact with the liquid crystal, considering the alignment of the liquid crystal and maintaining of a voltage, it is required to select a resist material which is highly reliable.

The following describes a method of forming the seal materials 23. First, the seal materials 23 are formed on the side of the CF substrate 21. After applying a polyimide alignment film onto the CF substrate 21 and carrying out an alignment process by rubbing, the adhesive resist is applied with respect to the entire surface of the alignment film by spin coating. Here, the rotation speed of the spin coater is optimized so that the film thickness of the alignment film is several $\mu$m. After carrying out a pre-baking process at a temperature in a range of 80° C. to 90° C., the adhesive resist is patterned by photolithography so as to realize the pattern of the seal materials 23 as shown in FIG. 12. Here, as shown in FIG. 10, on the CF substrate 21, the adhesive resist is patterned in such a manner that the pattern in positioned on the BM 12 facing the connected portion of the TFT substrates 22; in other words, the pattern is on a position corresponding to the BM 12.

As a developer solution used in patterning, it is required to select a developer solution which does not damage the alignment film after alignment process. Also, depending on the material of the adhesive resist used, post-baking process may be carried out.

As described, since the seal materials 23 are made of adhesive resist, and are formed by photolithography, it is possible to control the pattern width dimension accuracy and the positioning accuracy in an order of micro meters.

The following describes a method of forming the seal materials 24. The seal materials 24 are formed on the CF substrate 21 after forming the seal materials 23 thereon. As a material of the seal materials 24, an epoxy heat curable adhesive is adopted, and the seal materials 24 are formed by the dispense profiling method in the pattern as shown in FIG. 12. The epoxy heat curable adhesive has superior adhesion and reliability, and is widely adopted in the LCD.

Then, with respect to the CF substrate 21 provided with the seal materials 23 and the seal materials 24 in the described manner, two TFT substrates 22, each having a size substantially half the CF substrate 21, are positioned on the pattern of the seal materials 23 and 24, and are combined with the CF substrate 21. Note that, the TFT substrates 22 used here are applied with a polyimide alignment film, and after carrying out an alignment process by rubbing, the spacers are dispersed over the alignment film.

Thereafter, using a press-baking device, permanent baking (post-baking) is carried out at a temperature of 170° C. to 180° C. while pressing the substrates so as to cure the seal materials 23 and 24 simultaneously, and the bonding of the CF substrate 21 and the TFT substrates 22 is completed. Note that, the press-baking device may be of a pressure-applying type or a pressure-reducing type. A spacing between the CF substrate 21 and the TFT substrates 22 is controlled by the spacers, and is uniformly formed in several $\mu$m.

Then, the connected portion of the two TFT substrates 22 is filled with a transparent adhesive 5 whose refractive index has been adjusted, and liquid crystal is injected through the openings 15.

As described, in the LCD 20 of the present embodiment, as the seal materials 23 for which dimension accuracy and positioning accuracy are demanded, and as the seal materials 24 for which strong adhesion is demanded, it is possible to adopt materials meeting such demands, respectively. Namely, in the display region, by using the seal materials 23 having superior dimension accuracy and positioning accuracy, it is possible to reduce the design margin of the width of the BM 12 covering and disguising the seal materials 23, thus increasing the aperture ratio of the pixels.

Specifically, the width of the BM 12, for which substantially 0.5 mm had been required conventionally, can be made not more than 0.3 mm, and the aperture ratio of the pixels of the LCD in a 40-inch SVGA (Super Video Graphics Array), which had been substantially 30 percent conventionally, can be increased to substantially 50 percent. Also, outside the display region, by using the seal materials 24 having high reliability such as adhesion strength, it is possible to provide the LCD 20 which is highly reliable against vibrations and various surrounding environmental conditions.

Namely, the LCD in accordance with the present invention includes a plurality of small substrates having pixel electrodes, and at least one counter substrate having common electrodes, the plurality of small electrodes being connected to one another side by side on a single plane so as to face the counter substrate, the plurality of small substrates and the counter substrate being combined with each other by a seal material provided along a periphery on a surface of each of the plurality of small substrates facing the counter substrate, the display region including a plurality of pixels being formed by a liquid crystal layer held in a spacing surrounded by the plurality of small substrates, the counter substrate, and the seal material, wherein the seal material is composed of a first seal material and a second seal material made of a material different from that of the first seal material, the first seal material being provided within a display region, and the second seal material being provided outside the display region.

With this arrangement, within the display region, as the first seal material, it is possible to adopt a material having superior dimension accuracy and positioning accuracy, thus forming a fine seal pattern. This allows a seal pattern to be formed in such a manner that the aperture ratio of pixels can be made as large as possible, thus providing an LCD having a large aperture ratio of pixels and superior displaying quality. Also, outside the display region, as the second seal material, it is possible adopt a material having high adhesion and high reliability, thus providing an LCD having superior adhesion, reliability, and durability.

Also, the LCD in accordance with the present invention, in addition to the above arrangement, has an arrangement wherein the first seal material is made of photoresist having adhesion.

With this arrangement, since the photoresist having adhesion can be accurately applied by a generally adopted resist applying method such as spin coating, it is possible to control the thickness of the first seal material in an order of sub micro meters. This allows the dimension of the height of the first seal material to be adjusted with high accuracy. Thus, it is also possible to accurately control the width of the first seal material after bonding the counter substrate and the small substrates with each other.

Further, the LCD in accordance with the present invention, in addition to the above arrangement, has an arrangement wherein the first seal material is provided on a position corresponding to a BM formed on the counter substrate.

With this arrangement, since the first seal material is disguised by the BM, in actual displaying, it is possible to mask the adverse effect of the first seal material on the display screen.

The manufacturing method of an LCD in accordance with the present invention includes the step of forming a display region including a plurality of pixels by combining with each other (a) a plurality of small substrates having pixel electrodes, connected to each other side by side on a single plane and (b) at least one counter substrate having common electrodes, facing the plurality of small substrates, the plurality of small substrates and the counter substrate being combined with each other by a seal material provided on a periphery on a surface of each of the plurality of small substrates facing the counter substrate, the display region being formed by a liquid crystal layer held in a spacing surrounded by the plurality of small substrates, the counter substrate, and the seal material, wherein a portion of the seal material, positioned within the display region is patterned by photolithography.

With this method, since the width and the position of the seal material provided within the display region are controlled in an order of micro meters, it is possible to adjust the dimension of the width and the position of the first seal material with high accuracy. This allows the seal pattern to be formed in such a manner that the aperture ratio of pixels can be made as large as possible. As a result, it is possible to manufacture an LCD having a desirable displaying quality without lowering the aperture ratio of pixels and without discontinuity of display screen.

Fourth Embodiment

The following will describe still another embodiment of the present invention referring to attached drawings. Note that, members having the same functions as the members indicated in First through Third Embodiment are given the same reference numerals, and explanations thereof are omitted.

Figure 13:
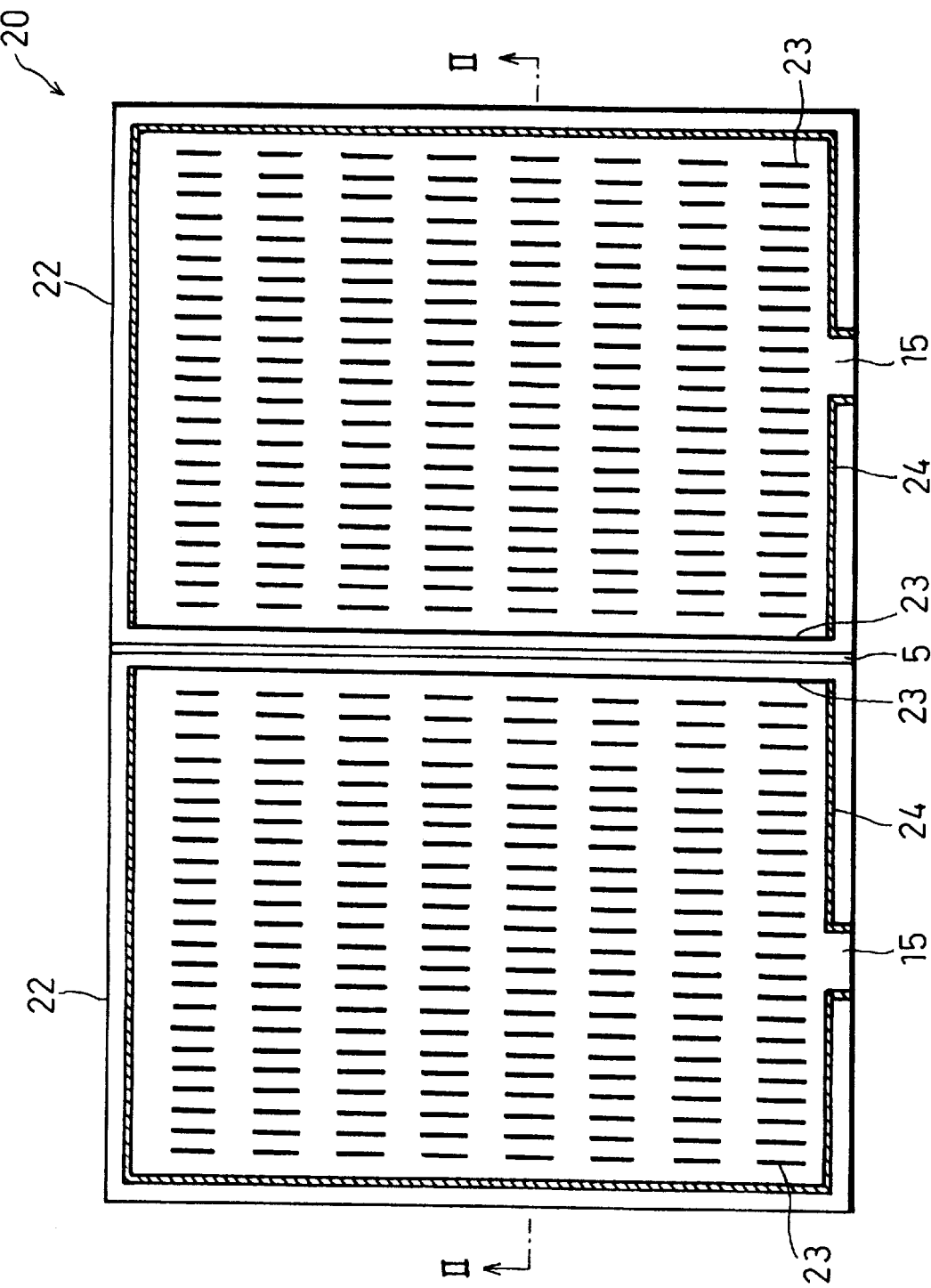
FIG. 13 is a plan view showing positions of seal materials on TFT substrates of a liquid crystal display device in accordance with Fourth Embodiment of the present invention.
Figure 14:
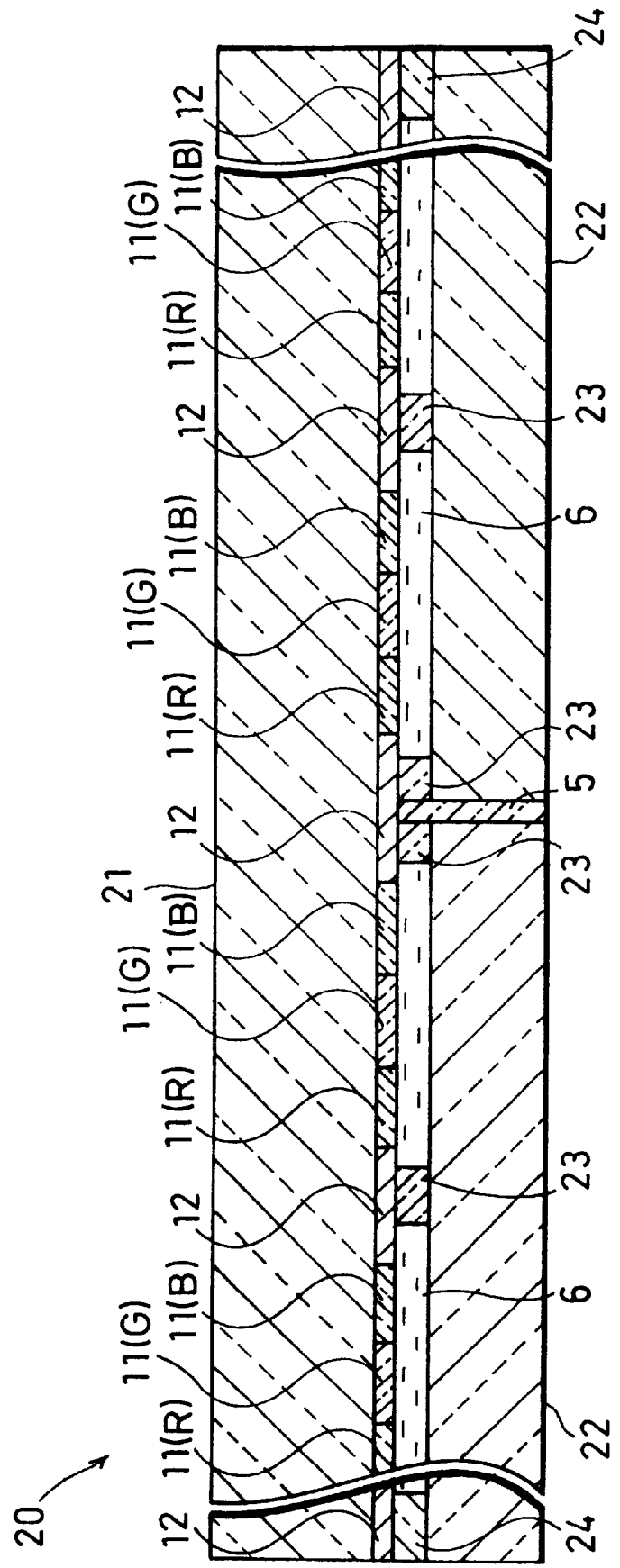
FIG. 14 is a cross sectional view of the liquid crystal display device of FIG. 13 taken along a line II—II.

FIG. 13 a plan view of an LCD 20 in accordance with the present embodiment showing the positions of seal materials 23 and seal materials 24 on the surfaces of TFT substrates 22, and FIG. 14 is a cross sectional view of FIG. 13 taken along the line II—II.

The seal materials 23, which have been formed by patterning of an adhesive resist, are provided not only along the connected portion on the periphery on the surface of each of the TFT substrates 22 facing the CF substrate 21 but also within the display region inside the periphery on the surface of each of the TFT substrates 22 facing the CF substrate 21. The seal materials 23 are formed at once by the described photolithography.

Here, as shown in FIG. 13, when the shape of the seal materials 23 formed within the display region inside the periphery of each of the TFT substrates 22 are in the form of a plurality of "islands" or lines, the liquid crystal can be smoothly injected into the spacing between the CF substrate 21 and the TFT substrates 22. Also, as shown in FIG. 14, when the seal materials 23 formed within the display region inside the periphery of each of the TFT substrates 22 are patterned so as to be positioned on the BM 12 formed on the CF substrate 21, since the seal materials 23 are covered by the BM 12, distortion of the display image, due to the seal materials 23, is not generated in actual displaying.

As described, in the LCD 20 in accordance with the present embodiment, the same effects as obtained in the LCD 20 of Third Embodiment are obtained, and since the CF substrate 21 and the TFT substrates 22 are bonded with each other by the seal materials 23 formed within the display region inside the periphery of each of the TFT substrates 22, it is possible to maintain a uniform thickness of the liquid crystal layers 6 even when the LCD 20 is made larger. Thus, for example, when the display region area is increased to around 40 inch, while in the conventional LCD in which the thickness of the liquid crystal layers 6 is not fixed, the thickness of the liquid crystal layers 6 is changed by flexing of substrates caused by slight vibrations and thus the displaying ability is deteriorated, in the present LCD 20, such a problem is not presented.

Also, because the seal materials 23 formed within the display region inside the periphery of each TFT substrate 22 act as a space keeper between the CF substrate 21 and the TFT substrates 22, it is not required to disperse the spacers in the manner as described in Third Embodiment, and display failure and other defects can be eliminated.

Namely, the LCD in accordance with the present invention, in addition to the arrangement of Third Embodiment, has an arrangement wherein the first seal material is also provided inside the periphery on the surface of each of the plurality of small substrates facing the counter substrate.

With this arrangement, even when the area of the small substrates is increased, it is possible, by the first seal material, to maintain a constant spacing between the counter substrate and each of the small substrates holding the liquid crystal. Thus, it is possible to prevent a phenomenon in which a displaying quality is deteriorated by flexing of the substrates and a change in the thickness of the liquid crystal layer caused by vibration and an externally applied pressure on the liquid crystal screen.

Further, it is preferable that the first seal material provided inside the periphery on the surface of each of the plurality of small substrates facing the counter substrate is provided in the form of a plurality of "islands".

With this arrangement, since the first seal material provided inside the periphery on the surface of each of the plurality of small substrates facing the counter substrate does not obstruct injection of liquid crystal, the liquid crystal is completely enclosed in the spacing between the counter substrate and each of the small substrates.

Also, it is preferable that the first seal material provided inside the periphery on the surface of each of the plurality of small substrates facing the counter substrate is provided on a position corresponding to the BM formed on the counter substrate.

With this arrangement, since the first seal material is disguised by the BM, in actual displaying, it is possible to reduce the adverse effect on the display screen as caused by the first seal material provided inside the periphery on the surface of each of the plurality of small substrates facing the counter substrate.

Fifth Embodiment

The following will describe still another embodiment of the present invention referring to attached drawings. Note that, members having the same functions as the members indicated in First through Fourth Embodiment are given the same reference numerals, and explanations thereof are omitted.

Figure 15:
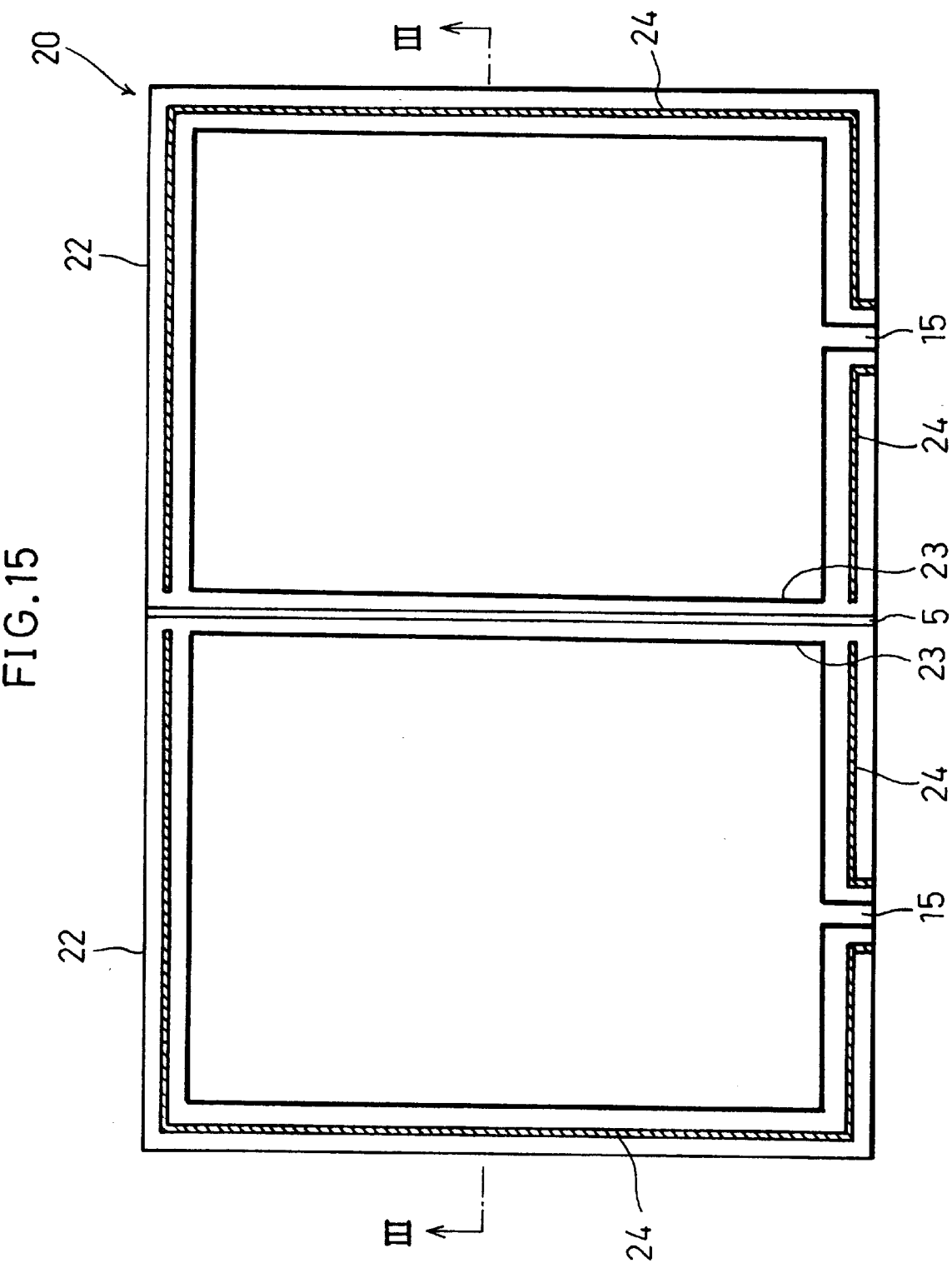
FIG. 15 is a plan view showing positions of seal materials on TFT substrates of a liquid crystal display device in accordance with Fifth Embodiment of the present invention.
Figure 16:
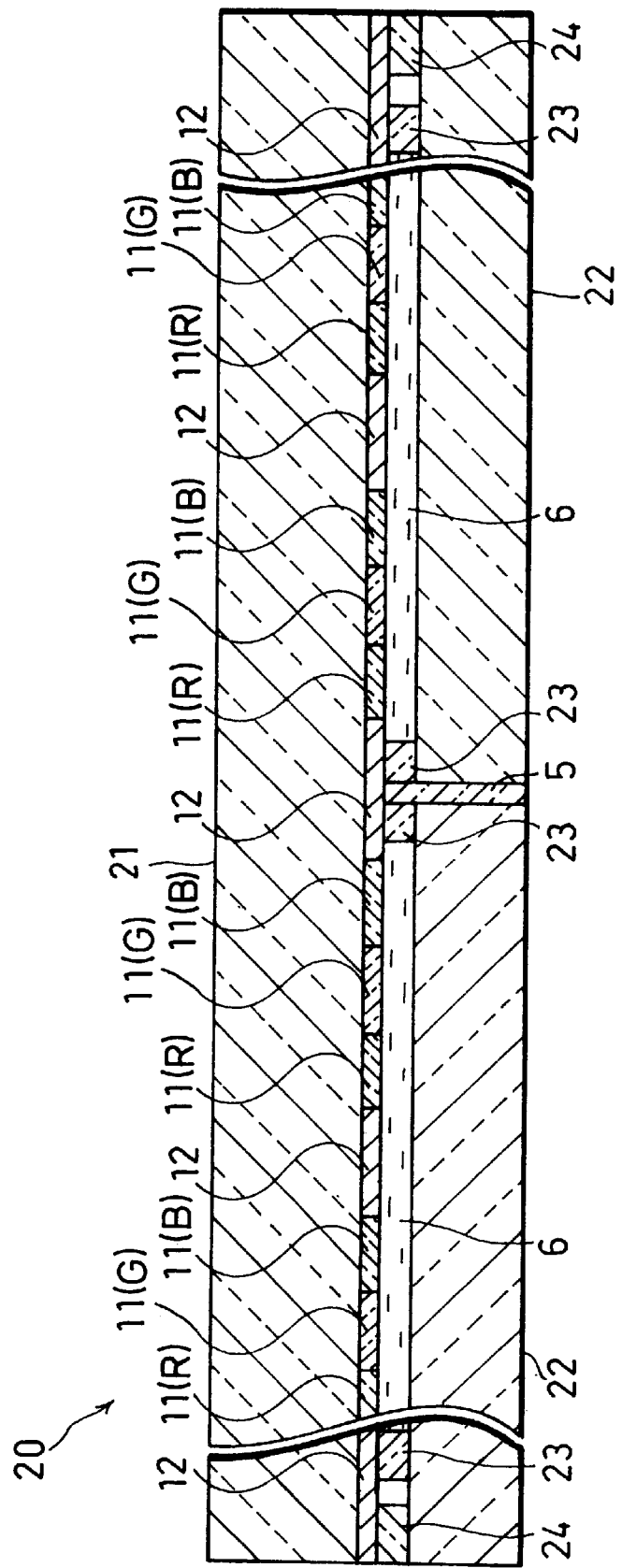
FIG. 16 is a cross sectional view of the liquid crystal display device of FIG. 15 taken along a line III—III.

FIG. 15 a plan view of a LCD 20 in accordance with the present embodiment showing the positions of seal materials 23 and seal materials 24 on the surfaces of TFT substrates 22, and FIG. 16 is a cross sectional view of FIG. 15 taken along the line III—III.

The seal materials 23, which have been formed by patterning of an adhesive resist, are provided not only along the connected portion on the periphery on the surface of each of the TFT substrates 22 facing the CF substrate 21 but also outside the display region, along and parallel to the inner side of the seal materials 24. Namely, the seal materials 23 are provided throughout the entire periphery of each of the TFT substrates 22 so as not to close the opening 15. Thus, in the present embodiment, the liquid crystal layers 6 are sealed only by the seal materials 23. The seal materials 23 are formed at once by the described photolithography.

Here, as shown in FIG. 16, when the seal materials 23 formed along the inner side of the seal materials 24 are patterned so as to be positioned on the EM 12, distortion of the display image, due to the seal materials 23, is not generated in actual displaying.

As described, in the LCD 20 in accordance with the present embodiment, the same effects as obtained in Third Embodiment are obtained, and since the seal materials 23 and 24 constitute a double-sealing structure outside the display region, it is possible to obtain stronger adhesion with higher reliability, thus providing an LCD which is shock resistant, and is highly resistant to a change in environment.

Sixth Embodiment

The following will describe still another embodiment of the present invention referring to attached drawings. Note that, members having the same functions as the members indicated in First through Fifth Embodiment are given the same reference numerals, and explanations thereof are omitted.

Figure 17:
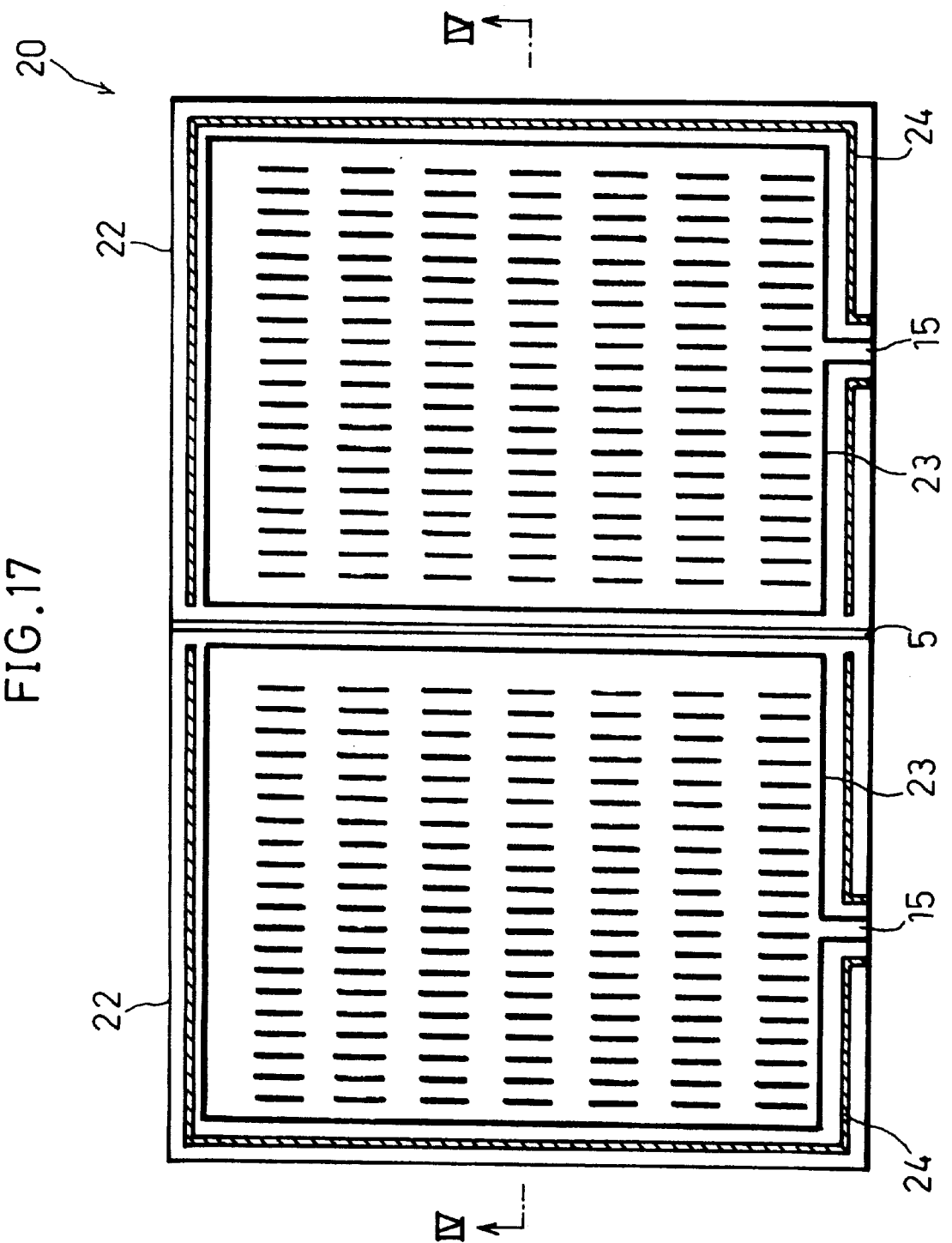
FIG. 17 is a plan view showing positions of seal materials on TFT substrates of a liquid crystal display device in accordance with Sixth Embodiment of the present invention.
Figure 18:
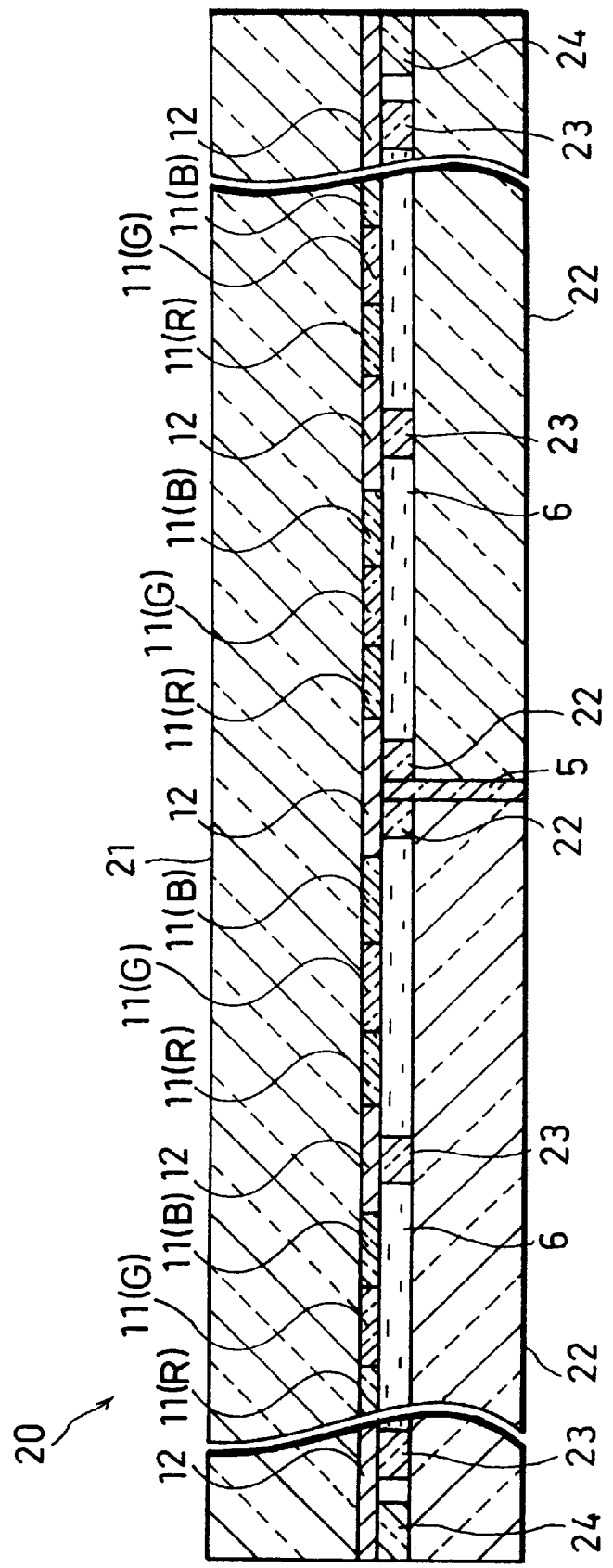
FIG. 18 is a cross sectional view of the liquid crystal display device of FIG. 17 taken along a line IV—IV.
Figure 19A:
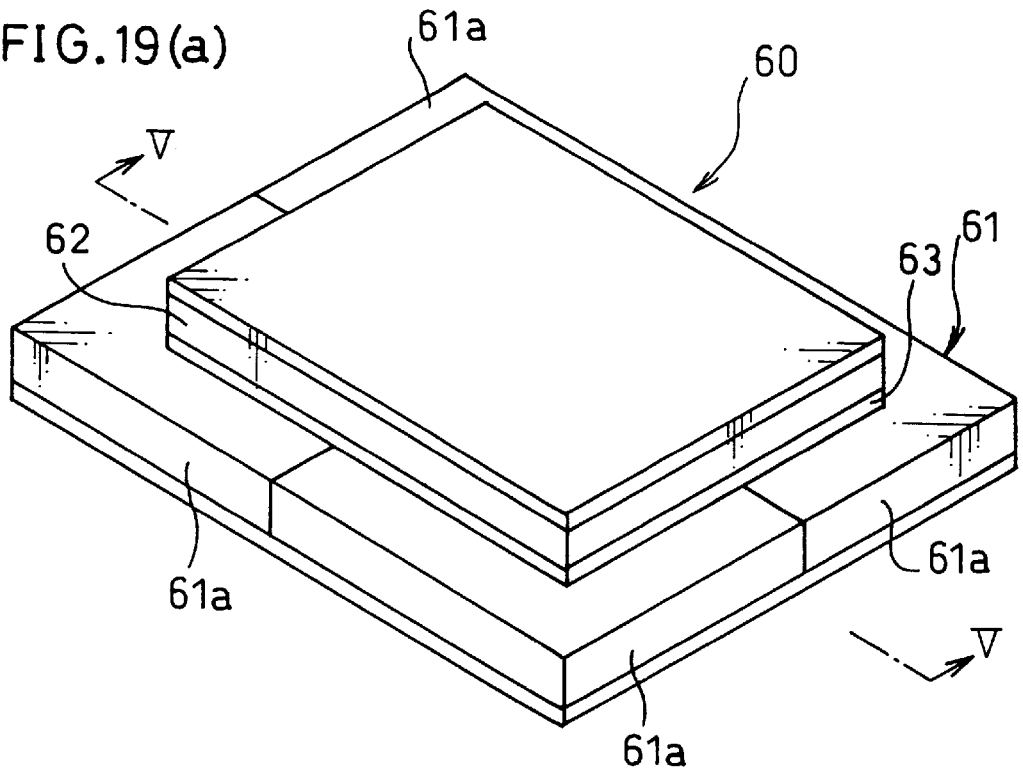
FIG. 19(a) is a perspective view showing a conventional liquid crystal display device.
Figure 19B:
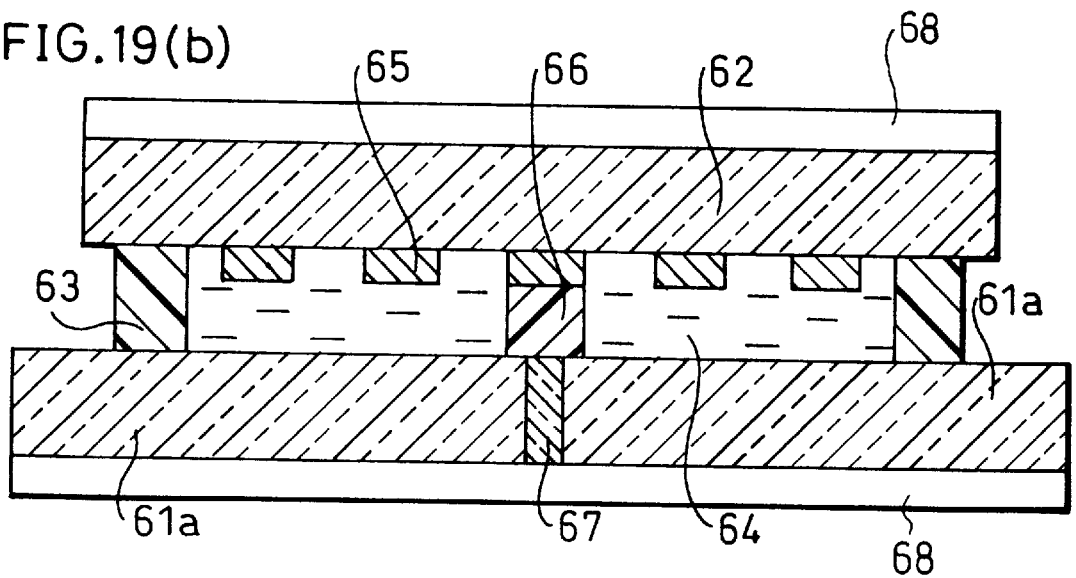
FIG. 19(b) is a cross sectional view of the liquid crystal display device of FIG. 19(a) taken along a line V—V.
Figure 20A:
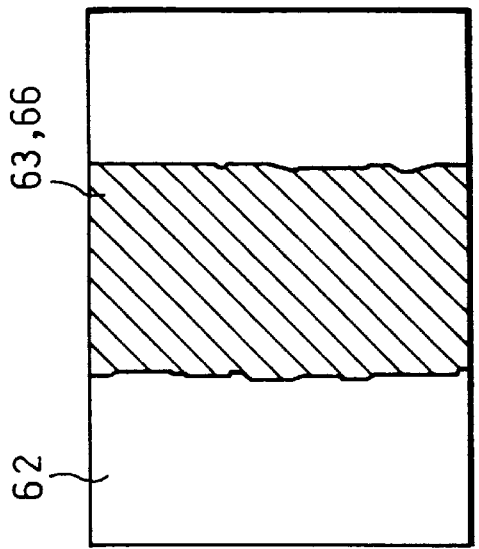
FIGS. 20(a)/(b) is a plan view and a cross sectional view showing a shape of the seal material or the spacer on a surface of a counter substrate immediately after screen printing or dispense profiling.
Figure 20C:
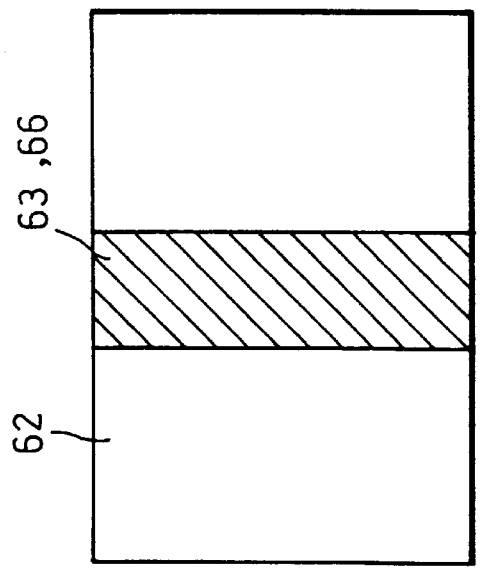
FIGS. 20(c)/(d) is a plan view and a cross sectional view showing a shape of the seal material or the spacer after carrying out gapping in a pressing process.
Figure 20B:
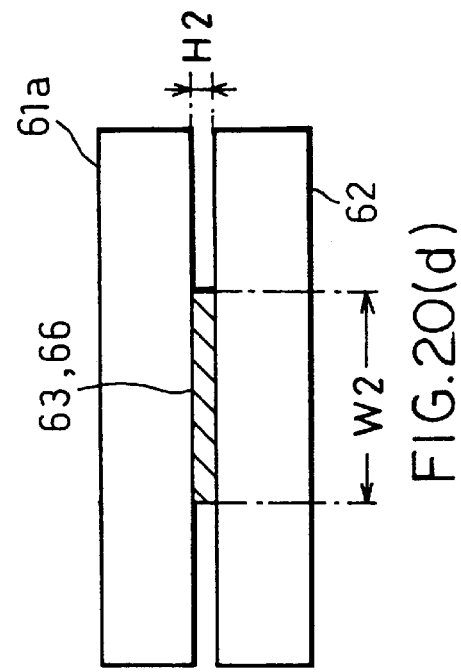
Figure 20D:
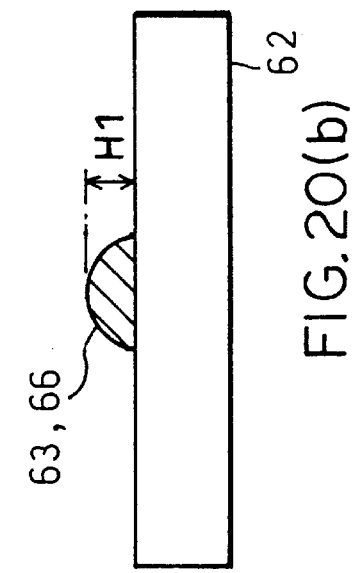

FIG. 17 a plan view of an LCD 20 in accordance with the present embodiment showing the positions of seal materials 23 and seal materials 24 on the surfaces of TFT substrates 22, and FIG. 18 is a cross sectional view of FIG. 17 taken along the line IV—IV.

The seal materials 23, which have been formed by patterning of an adhesive resist, are provided not only along the connected portion on the periphery on the surface of each of the TFT substrates 22 facing the CF substrate 21 but also along the inner side of the seal materials 24, within the display region inside the periphery on the surface of each of the TFT substrate 22 facing the CF substrate 21 as well as outside the display region. The seal materials 23 are formed at once by the described photolithography.

Here, as shown in FIG. 17, as in the LCD 20 of Fourth Embodiment, when the shape of the seal materials 23 provided within the display region inside the periphery of each of the TFT substrates 22 are in the form of a plurality of "islands" or lines, the liquid crystal can be smoothly injected into the spacing between the CF substrate 21 and the TFT substrates 22. Also, as shown in FIG. 18, when the seal materials 23 formed within the display region inside the periphery of each of the TFT substrates 22 are patterned so as to be positioned on the BM 12 formed on the CF substrate 21, since the seal materials 23 are covered by the BM 12, distortion of the display image, due to the seal materials 23, is not generated in actual displaying.

Also, as shown in FIG. 18, as in the LCD 20 of Fifth Embodiment, when the seal materials 23 formed along the inner side of the seal materials 24 are patterned so as to be positioned on the BM 12 outside the display region, distortion of the display image, due to the seal materials 23, is not generated in actual displaying.

As described, in the LCD 20 in accordance with the present embodiment, the same effects as obtained in Fourth and Fifth Embodiment are obtained. Namely, since the CF substrate 21 and the TFT substrates 22 are bonded with each other by the seal materials 23 formed within the display region inside the periphery of each of the TFT substrates 22, it is possible to maintain a uniform thickness of the liquid crystal layers 6 even when the LCD 20 is made larger. Thus, the thickness of the liquid crystal layers 6 is not changed by external disturbance in response to an increase in the display region area, and therefore the displaying ability is not deteriorated by a change in the thickness of the liquid crystal layers 6.

Also, since the seal materials 23 and 24 constitute a double-sealing structure outside the display region, it is possible to obtain stronger adhesion with higher reliability, thus providing an LCD which is shock resistant, and is highly resistant to a change in environment.

Namely, the LCD in accordance with the present invention, in addition to the arrangement of Third Embodiment and as described in Fifth Embodiment, has an arrangement wherein the first seal material is also provided on a region along the second seal material, outside the display region.

With this arrangement, since the first seal material and the second seal material has a double-sealing structure outside the display region, higher adhesion and higher reliability are obtained.

Further, the LCD in accordance with the present invention also has an arrangement (arrangement of Fourth Embodiment) wherein the first seal material is also provided inside the periphery on the surface of each of the plurality of small substrates facing the counter substrate, and preferably, the first seal material is provided in the form of a plurality of "islands" and on a position corresponding to the BM formed on the counter substrate.

Therefore, with the described arrangement, even when the area of the small substrates is increased, it is possible, by the first seal material, to maintain a constant spacing between the counter substrate and each of the small substrates holding the liquid crystal. Thus, it is possible to prevent a phenomenon in which a displaying quality is deteriorated by flexing of the substrates and a change in the thickness of the liquid crystal layer caused by vibration and an externally applied pressure on the liquid crystal screen.

Also, since the first seal material provided inside the periphery on the surface of each of the plurality of small substrates facing the counter substrate does not obstruct injection of liquid crystal, the liquid crystal is completely enclosed in the spacing between the counter substrate and each of the small substrates.

Further, since the first seal material is disguised by the BM, in actual displaying, it is possible to reduce the adverse effect on the display screen as caused by the first seal material provided inside the periphery on the surface of each of the plurality of small substrates facing the counter substrate.

Note that, the LCD 20 of First through Sixth Embodiment each has an arrangement wherein two TFT substrates 22 are combined with a single CF substrate 21; however, as disclosed in Japanese Unexamined Patent publication No. 122769/1996 (Tokukaihei 8-122769), the present invention is also applicable to an LCD having an arrangement wherein a plurality of liquid crystal panels are connected to one another. Namely, of the seal materials for sealing liquid crystal layers in the liquid crystal panels, the seal materials contacting the edge surfaces of the connected liquid crystal panels and the seal materials formed on the other portions are made of different materials.

Also, in First through Sixth Embodiment, as the LCD 20, an LCD of active-matrix type adopting TFT is adopted. However, it is also possible to adopt an MIM (Metal-Insulator-Metal), an LCD of active-matrix type adopting other types of active elements, or an LCD of simple-matrix type, etc.

Also, the LCD 20 of First through Sixth Embodiment each has an arrangement wherein two TFT substrates 22 are provided. However, it is possible to adopt an arrangement wherein four TFT substrates 22 are provided and positioned in a "tile" manner, or four or more TFT substrates 22 are provided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device, comprising:

a large substrate having a non-transmissive pattern formed in matrix;

a connected substrate, facing said large substrate, composed of a plurality of small substrates connected to one another on side surfaces;

a liquid crystal layer sandwiched between said large substrate and said connected substrate;

a seal material for combining said large substrate and said connected substrate with each other, wherein the seal material provided at connections between the side surfaces of said small substrates is maintained within a region of said non-transmissive pattern;

a spacer for maintaining a predetermined value for a thickness of said liquid crystal layer sandwiched between said large substrate and said connected substrate, wherein said seal material and said spacer are made of resist having pressure tightness.

2. The liquid crystal display device as set forth in claim 1, wherein the resist has adhesion.

3. The liquid crystal display device as set forth in claim 1, wherein said spacer includes a layer of adhesive.

4. The liquid crystal display device as set forth in claim 1, wherein said liquid crystal layer is divided by said seal material with respect to each of the plurality of small substrates.

5. The liquid crystal display device as set forth in claim 1, wherein said connected substrate is a substrate which is made by connecting the plurality of small substrates with a connection gap within a region of the non-transmissive pattern formed in matrix provided on said large substrate facing said connected substrate.

6. The liquid crystal display device as set forth in claim 1, wherein the connection gap between the plurality of small substrates of said connected substrate is filled with resin whose refractive index is substantially equal to a refractive index of a material of the plurality of small substrates.

7. The liquid crystal display device as set forth in claim 1, wherein the resist constituting said seal material and said spacer is formed on said large substrate.

8. A method for manufacturing a liquid crystal display device, comprising the steps of:

forming a resist to be a seal material and a spacer in a predetermined pattern in a cured state on a large substrate having a non-transmissive pattern formed in matrix;

combining a plurality of small substrates with the large substrate provided with the resist in such a manner that the plurality of small substrates constitute a single connected substrate by being adjacent to one another side by side;

providing the seal material at connections between the side surfaces of said small substrates such that the seal material is maintained within a region of said non-transmissive pattern; and setting a thickness of a spacing between the large substrate and the connected substrate to a predetermined value by pressing against each other the large substrate and the connected substrate facing each other.

9. The method as set forth in claim 8, further comprising the step of transferring and forming a layer of adhesive on the resist by facing and combining with each other the large substrate and a transfer substrate applied with an adhesive on a surface to be contacted with the large substrate.

10. The method as set forth in claim 9, wherein the large substrate and the transfer substrate are pressed against each other by atmospheric pressure.

* * * * *